(12) United States Patent
Tatsu et al.

(10) Patent No.: US 8,451,703 B2
(45) Date of Patent: May 28, 2013

(54) OPTICAL PICKUP AND OPTICAL INFORMATION RECORDING AND REPRODUCING APPARATUS

(75) Inventors: Eriko Tatsu, Kokubunji (JP); Shigeharu Kimura, Yokohama (JP); Tomoto Kawamura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/227,497

(22) Filed: Sep. 8, 2011

(65) Prior Publication Data

US 2012/0087220 A1 Apr. 12, 2012

(30) Foreign Application Priority Data

Oct. 12, 2010 (JP) ................................ 2010-229221

(51) Int. Cl.
*G11B 7/00* (2006.01)
(52) U.S. Cl.
USPC ..................................................... 369/112.03
(58) Field of Classification Search
USPC ............... 369/112.01, 112.02, 112.03, 44.23, 369/44.24, 112.1, 110.03, 112.07, 109.2, 369/112.04, 112.15, 44.26, 44.41, 44.42
See application file for complete search history.

(56) References Cited

U.S. PATENT DOCUMENTS

| | | | | |
|---|---|---|---|---|
| 6,445,668 B2* | 9/2002 | Sugiura et al. | ........... | 369/112.12 |
| 6,891,675 B2* | 5/2005 | Ohyama | ........................ | 359/566 |
| 8,159,907 B2* | 4/2012 | Nagatomi | .................. | 369/44.23 |
| 2010/0061202 A1 | 3/2010 | Yamazaki et al. | | |

FOREIGN PATENT DOCUMENTS

| | | |
|---|---|---|
| JP | 2008-287851 | 11/2008 |
| JP | 2009-170087 | 7/2009 |

\* cited by examiner

*Primary Examiner* — Nabil Hindi
(74) *Attorney, Agent, or Firm* — Antonelli, Terry, Stout & Kraus, LLP.

(57) ABSTRACT

An optical pickup includes a light source, an optical system for irradiating a recording medium including a plurality of recording layers with light from the light source, a diffraction optical element that divides light reflected from the recording medium into a plurality of optical fluxes and diffracts the fluxes, and an optical detector receiving the optical flux diffracted by the diffraction optical element. The optical detector includes a light receiving element detecting a focus error signal, wherein a longitudinal direction of the light receiving element is arranged to coincide with a circumferential direction of the recording medium, or arranged to be inclined to a circumferential or radial direction.

10 Claims, 26 Drawing Sheets

FIG. 1
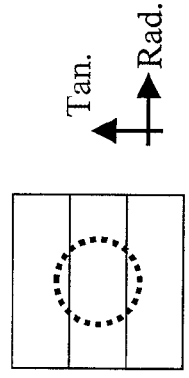
(a) Diffraction optical element
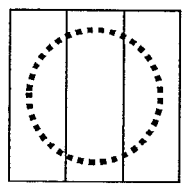
(b) Focus error detector
(i) SSD method
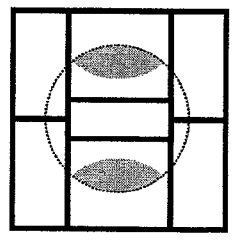
(a) Diffraction optical element
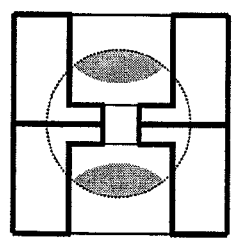
(b) Focus error detector
(ii) Knife edge method A
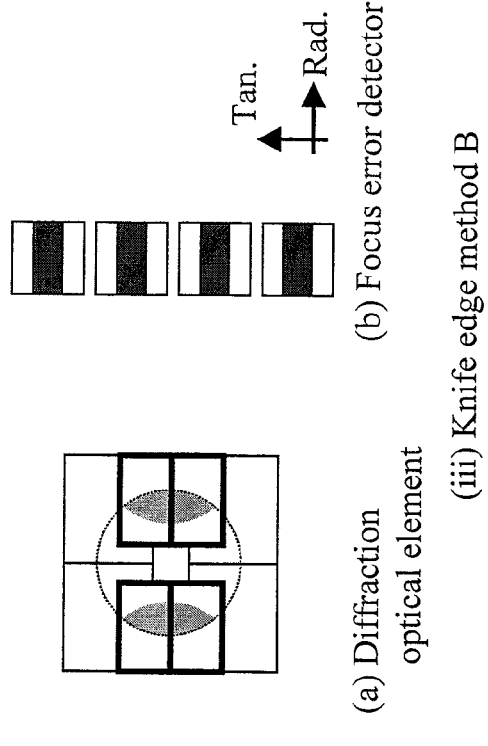
(a) Diffraction optical element
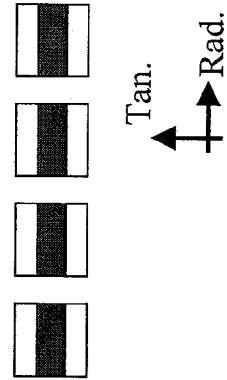
(b) Focus error detector
(iii) Knife edge method B FIG. 7
208
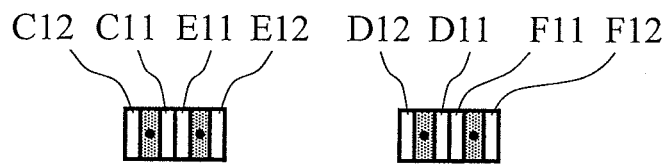
C12 C11 E11 E12    D12 D11  F11 F12
A10
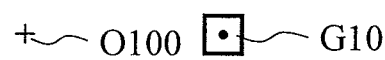
O100      G10
B10
F10  D10   E10  C10

FIG. 9
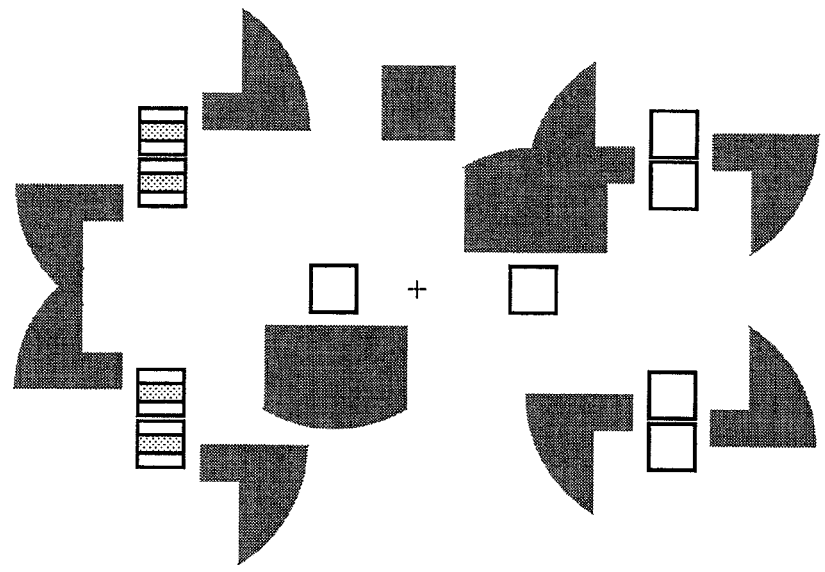
(b) Stray light from non-target layer disposed closer to substrate side than target layer
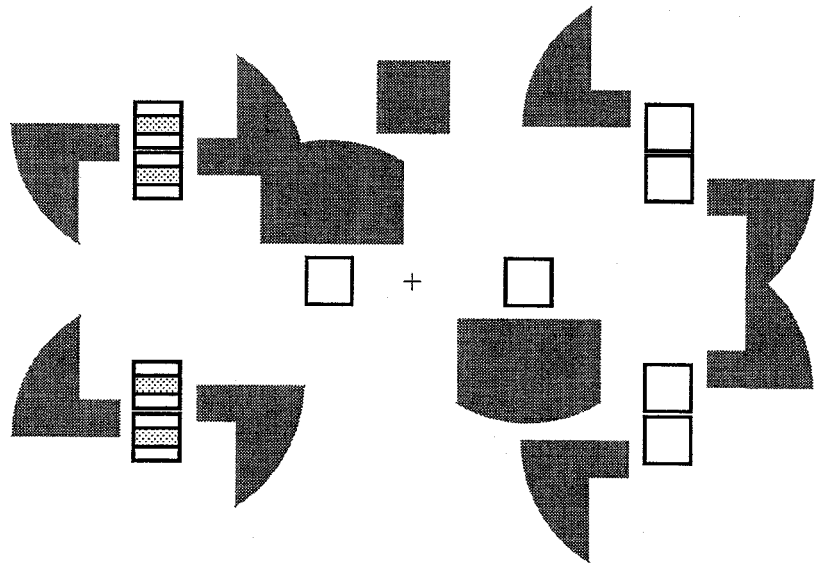
(a) Stray light from non-target layer disposed closer to incident surface side than target layer FE detector and situation of stray light FIG. 10B
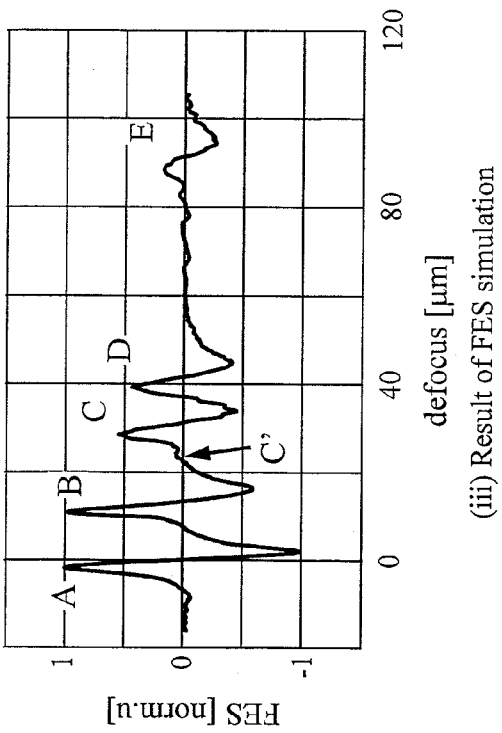
(iii) Result of FES simulation
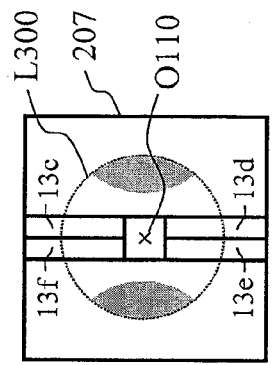
(ii) Diffraction grating 207 and position of reflected light L300
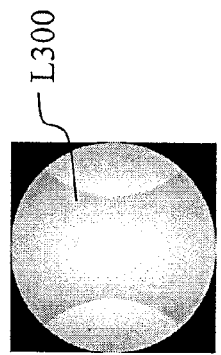
(i) Distribution of intensity of reflected light L300 on objective lens 205
FES in a case of on-tracking and without deviation of parts FIG. 10C
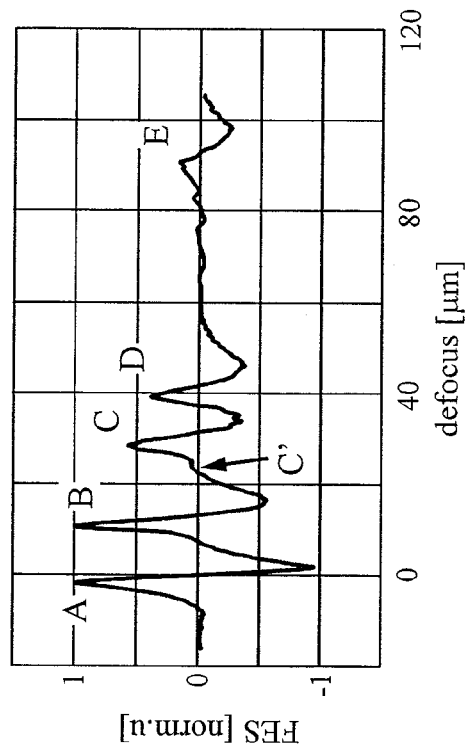
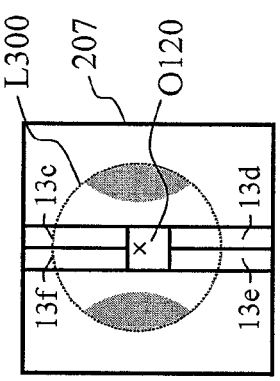
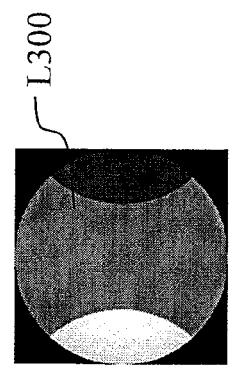
(i) Distribution of intensity of reflected light L300 on objective lens 205
(ii) Diffraction grating 207 and position of reflected light L300
(iii) Result of FES simulation
FES in a case of detracking by 80 nm and deviation of parts by 50 μm FIG. 11
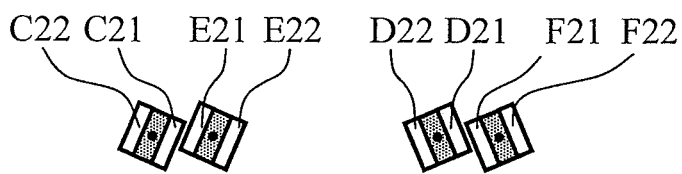
C22 C21  E21 E22    D22 D21  F21 F22
208
— A10
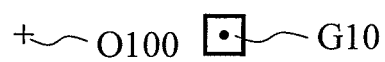
+ — O100    — G10
— B10
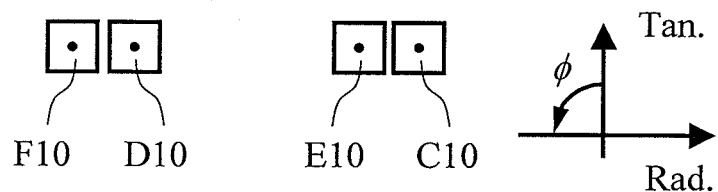
F10  D10    E10  C10
Tan.
φ
Rad.

FIG. 13
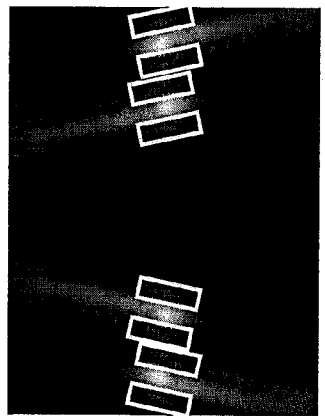
(a) FE detector and situation of stray light
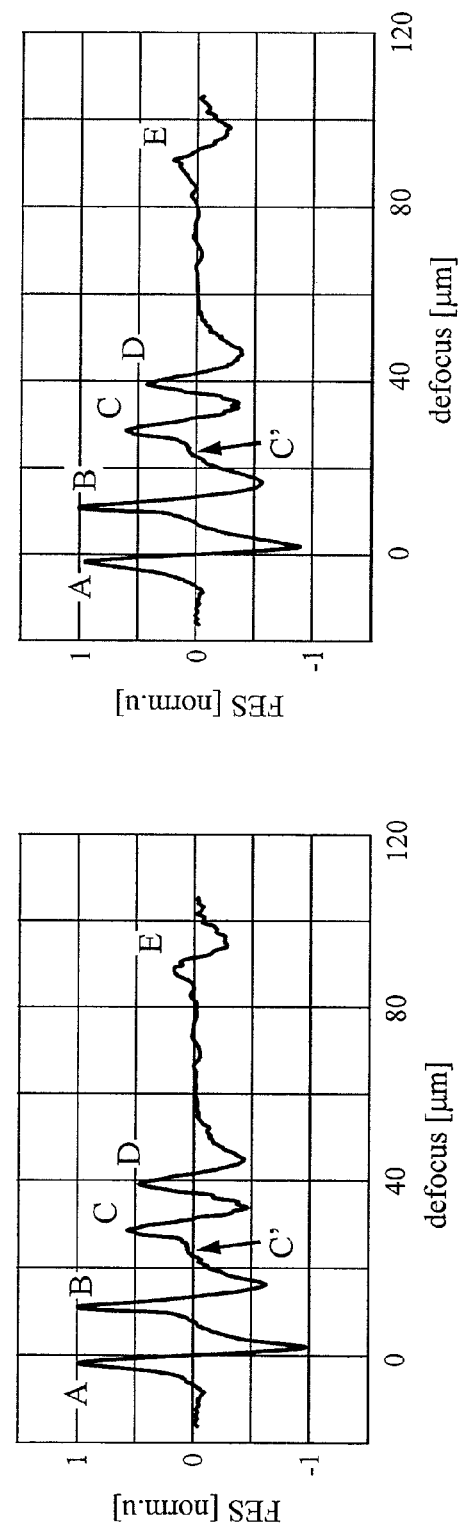
(b) FES in a case of on-tracking and without deviation of parts
(c) FES in a case of detracking by 80 nm and deviation of parts by 50 μm FIG. 16
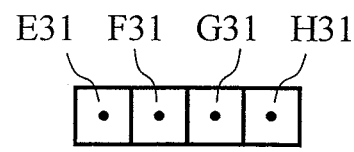
E31 F31 G31 H31
208
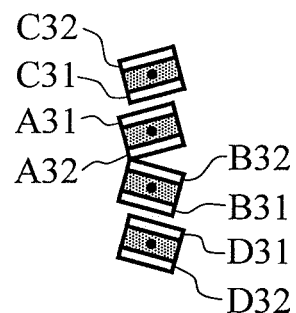
C32
C31
A31
A32
B32
B31
D31
D32
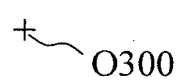
O300
I30
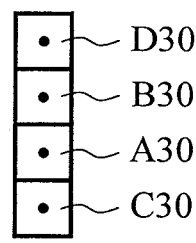
D30
B30
A30
C30
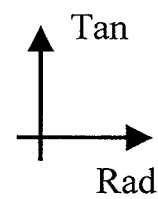
Tan
Rad
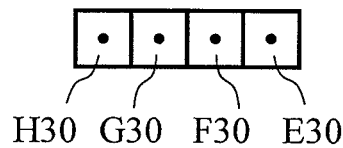
H30 G30 F30 E30

OPTICAL PICKUP AND OPTICAL INFORMATION RECORDING AND REPRODUCING APPARATUS

CLAIM OF PRIORITY

The present application claims priority from Japanese present application JP 2010-229221 filed on Oct. 12, 2010, the content of which is hereby incorporated by reference into this application.

BACKGROUND OF THE INVENTION

1. Field of the Invention

The present invention relates to an optical pickup and an optical information recording and reproducing apparatus, and, for instance, to an optical pickup for recording and reproducing of a multilayer optical disc including a plurality of recording layers and an optical information recording and reproducing apparatus mounted with the optical pickup.

2. Background Art

The optical information recording and reproducing apparatus has functions of recording information, such as music, video and various pieces of data, and reproducing the information onto and from an optical disc.

As to the optical disc, Blu-ray Disc (BD) including a blue semiconductor laser and a high NA objective lens has become commercially viable. In order to further increase capacity, commercialization of a multilayer optical disc, which includes a plurality of information recording layers, is planned.

However, the multilayer optical disc has a problem of interlayer crosstalk, in which reflected by a non-target layer other than a target layer for recording and reproduction leaks into a detector, thereby adversely affecting a servo signal. Hereinafter, a recording layer as a recording/reproducing target is referred to as a target layer, a recording layer other than the target layer is referred to as a non-target layer.

An optical disc apparatus causes an optical detector to receive light reflected from an optical disc, and generates a reproduction RF signal (RFS: radio frequency signal), a focus error signal (FES) and a tracking error signal (TES) from a detection signal according to an amount of received light. Tracking error (TE) detection methods include a differential push-pull (DPP) method and a differential phase detection (DPD) method. Focus error (FE) detection methods include an astigmatism method, a spot size detection (SSD) method and a knife edge method. Here, the SSD method is disclosed in JP 2008-287851A, and the knife edge method is disclosed in JP 2010-61751A (corresponding to US 2010/0061202 A) and JP 2009-170087A.

FIG. 1 shows examples of diffraction gratings and optical detectors of SSD and knife edge methods for detecting FE. FIG. 1 (i) shows a case of the SSD method. FIGS. 1 (ii) and (iii) show cases of the knife edge methods. (a) and (b) of FIGS. 1 (i) to (iii) correspond to a diffraction grating and an FES detector arrangement, respectively. FIGS. 1 (ii) and (iii) are different from each other in regions (shown by bold frames) of reflected light for detecting FE. In FIG. 1 (ii), detection is performed from reflected light in regions other than a central region of the reflected light and other than a push-pull (PP) region (knife edge method A). In FIG. 1 (iii), detection is performed from reflected light in a PP region (knife edge method B). As to a recording disc, in a case where an incident light spot is at a detracking position, balance of the amount of light in a PP region varies. Accordingly, it is required to suppress adverse effects on FE detection owing to detracking. Thus, in the SSD method, a division line of a detector, or the regions divided as strips, is arranged to be a radial direction (Rad. direction) of an optical disc. In the knife edge method, the longitudinal direction of strips of two divided receiving light regions for detecting defocusing of one spot is arranged to be the Rad. direction; the direction in which the divided receiving light regions are arranged is oriented to be a tangential direction (Tan. direction) of the optical disc, which is orthogonal to the longitudinal direction of the strip.

Techniques on measures against interlayer crosstalk, which becomes a problem when recording and reproducing are performed onto and from a multilayer optical disc, are disclosed for instance in JP 2008-287851A, JP 2010-61751A and JP 2009-170087A. Any of these techniques adopts a one beam pickup, employs a diffraction optical element for addressing interlayer crosstalk, and detects +1-order or higher order diffraction light or −1 or lower order diffraction light, thereby separating stray light from signal light.

SUMMARY OF THE INVENTION

An FES simulation is performed on a case of a knife edge method A shown in FIG. 1 (ii) in which NA is 0.85, magnification is 12, the pickup is a one beam optical type, and an L0 layer of a four-layer BD including recording layers L0, L1, L2 and L3 from a substrate side is a target layer. Separations between layers of the four-layer BD are 15.5, 19.5 and 11.5 μm for L0-L1, L1-L2 and L2-L3, respectively. FIG. 2 (a) shows a result of the simulation. Peaks for the respective layers are identified by symbols in the graph. A peak A corresponds to an S-shaped peak of the target layer L0. Peaks B to D sequentially correspond to non-target layers L1 to L3, respectively. A peak E corresponds to an S-shaped peak of a surface of a cover layer. In the graph of FIG. 2 (a), a C' can be identified in proximity to the peak C of the non-target layer L2. Since, in the multilayer optical disc, a non-target layer apart by two layers or more (hereinafter, referred to as a) exists, the separation between the target and distant layers are much wider than the separation between the target and an adjacent non-target layer. Accordingly, it can be inferred that an effect of spherical aberration is exerted in reflected light from the distant layer. A fact of appearance of such a quasi-peak C' is a phenomenon having been found for the first time by the result of this simulation. FIG. 2 (b) shows a diffraction grating and FE detectors of the simulation. Light beams in the regions shown by the symbols in the diffraction grating are detected by respective detectors assigned with the identical symbols. In a case of FIG. 2 (b), spots of light from the distant layer passing through the regions a to d in the diffraction grating are widened in directions shown by respective arrows on the FE detectors due to the spherical aberration. The longitudinal directions of the strips of the divided receiving light regions in the FE detectors coincide with the Rad. direction, and the direction in which light receiving regions are arranged coincides with the Tan. direction. Accordingly, in a case where the spot is widened in the direction shown by the arrow, light leaks into the divided receiving light regions. This leakage becomes a cause of generating a quasi-peak of FES. In a multilayer BD with low reflectivity, the intensities of S-shaped peaks of the non-target layers corresponding to the respective peaks B to D in FIG. 2 (a) are low. Accordingly, counting of the number of recording layers necessary to move the target layer to another recording layer becomes inaccurate, thereby causing a malfunction of movement between layers. FIG. 2 (c) shows an actual device measurement of FES of a knife edge method A in which NA is 0.85, magnification is 12, the pickup is a one beam optical type, and the L0 layer of the four-layer BD is the target layer. As with the result of the simulation, the quasi-peak C' has been confirmed in proximity to the peak C of the distant layer.

The problem solved by making the arrangement of the longitudinal direction of the light receiving element of the FE detector coincide with the tangential direction of the optical disc or be tilted with respect to the tangential direction by a prescribed extent.

More specifically, in the FE detection in recording and reproducing of the multilayer medium, in cases of:

(1) adopting the knife edge method A (FE detection from the region other than the central region of reflected light and other than the PP region);

(2) adopting the knife edge method B (FE detection from the PP region); and (3) adopting the SSD method, provided that the direction in which the spot is widened due to the spherical aberration is θ, the angle between the axis coinciding with the Tan. direction and the longitudinal direction of the light receiving element of the FE detector is defined as φ in the cases of (1) and (3), and the angle between the axis coinciding with the Rad. direction and the longitudinal direction of the light receiving element of the FE detector is defined as φ in the case of (2), the angle φ is $0 \leqq \phi \leqq 2\theta$0 or $0 < \phi \leqq 2\theta$.

In this region, a direction in which the detector detects defocusing (a direction orthogonal to the longitudinal direction of the light receiving element of the FE detector) and the direction in which the spot is widened become substantially perpendicular to each other. Therefore, substantially no effect of spherical aberration is caused in FES.

In the present invention, as to the optical pickup used for recording and reproducing of a multilayer optical disc, in a case of substantially condensing incident light on a distant layer according to the position of an objective lens, the effect of spherical aberration is reduced, thereby allowing realization of an optical pickup and an optical information recording and reproducing apparatus which have a reduced quasi-peak of FES.

BRIEF DESCRIPTION OF THE DRAWINGS

FIG. 1 is a diagram of a configuration of a conventional optical detector.

FIG. 7 is a schematic diagram showing a configuration of a detector of Embodiment 1.

FIG. 9 is a schematic diagram showing a position at which an optical detector is irradiated with stray light from a non-target layer in Embodiment 1.

FIG. 10B is a diagram showing a result of a simulation of a FE signal during on-tracking in Embodiment 1.

FIG. 10C is a diagram showing a result of a simulation of a FE signal during detracking in Embodiment 1.

FIG. 11 is a schematic diagram showing a configuration of a detector in Embodiment 2.

FIG. 13 is a diagram showing results of simulations of stray light and an FE signal at an FE light receiving element in Embodiment 2.

FIG. 16 is a schematic diagram showing a configuration of a detector of Embodiment 3.

DETAILED DESCRIPTION OF THE PREFERRED EMBODIMENTS

Embodiments of the present invention will hereinafter be described.

Embodiment 1

The description is made on a case of generating FES from reflected light L300 from regions of an optical disc 100 other than a PP region and other than a central region including the center of the optical axis of reflected light, that is, a case of the knife edge method A.

Provided that an angle between an axis A100 passing through the center of the reflected light L300 in the Tan. direction and a line passing through the center of a circular arc of a continuous reflected light region for detecting FE is θ, spherical aberration is strongly caused at and around the direction θ. It is provided that, in a light receiving element of the optical detector for FE in Embodiment 1, the inclination of the longitudinal direction of the strip is $0 \leqq \phi \leqq 2\theta$ with respect to the axis in the Tan. direction. In a case of substantially condensing incident light on the distant layer according to the position of the objective lens 205, this configuration prevents leakage of the spot of the stray light widened on the surface of the detector 208 due to the spherical aberration into the light receiving element.

<Configuration of Optical Information Recording and Reproducing Apparatus>

Figure 3:
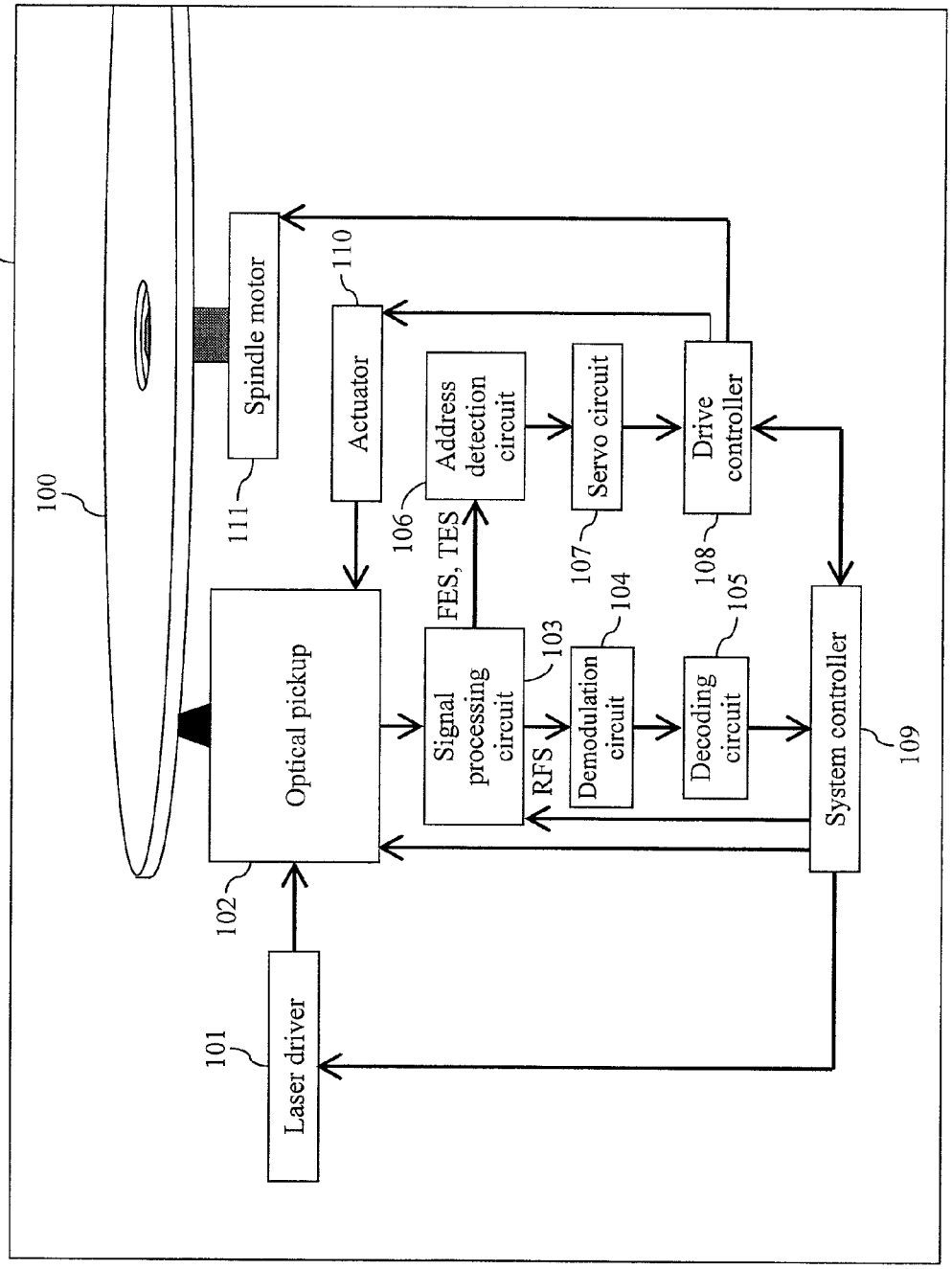
FIG. 3 is a block diagram showing an overall configuration of an optical information recording and reproducing apparatus.

FIG. 3 is a diagram showing a schematic configuration of an optical information recording and reproducing apparatus of the present invention. The optical information recording and reproducing apparatus 1 records or reproduces information onto or from an optical disc 100. This apparatus 1 includes: a laser driver 101; an optical pickup 102 that emits laser light and detects light reflected from the optical disc 100; a plurality of signal processors 103 to 108; an actuator 110 for recording and reproducing of a prescribed track on the optical disc 100; a spindle motor 111 rotating the optical disc 100; and a system controller 109 performing overall control of the optical information recording and reproducing apparatus 1.

A semiconductor laser 201 included in the optical pickup 102 is controlled by the laser driver 101. The optical disc 100 including a plurality of information recording layers is irradiated with an optical flux having emitted from the semiconductor laser 201 and passed through an objective lens 205 included in the optical pickup 102. Light reflected therefrom is detected by an optical detector 208 included in the optical pickup 102.

The signal processing circuit 103 generates a reproduction RF signal (RFS), an FE signal (FES) and a TE signal (TES) on the basis of the detection signal. RFS is transmitted to the system controller 109 via the demodulation circuit 104 and the decoding circuit 105. FES and TES are transmitted to the drive controller 108 via the address circuit 106 and the servo circuit 107. The drive controller 108 controls the spindle motor 111 on the basis of an instruction from the system controller 109 to rotate the optical disc 100 at a prescribed rotational velocity.

The actuator 110 receives a servo signal and an address signal from the drive controller 108, and controls the optical pickup 102 on the basis of the received signals.

The optical pickup 102 and the signal processing circuit 103 perform necessary controls and signal processings, according to difference in signal detection due to the type of the optical disc, such as BD-R/RE and BD-ROM, and other situations, on the basis of instructions from the system controller 109.

<Configuration of Optical Pickup>

Figure 4:
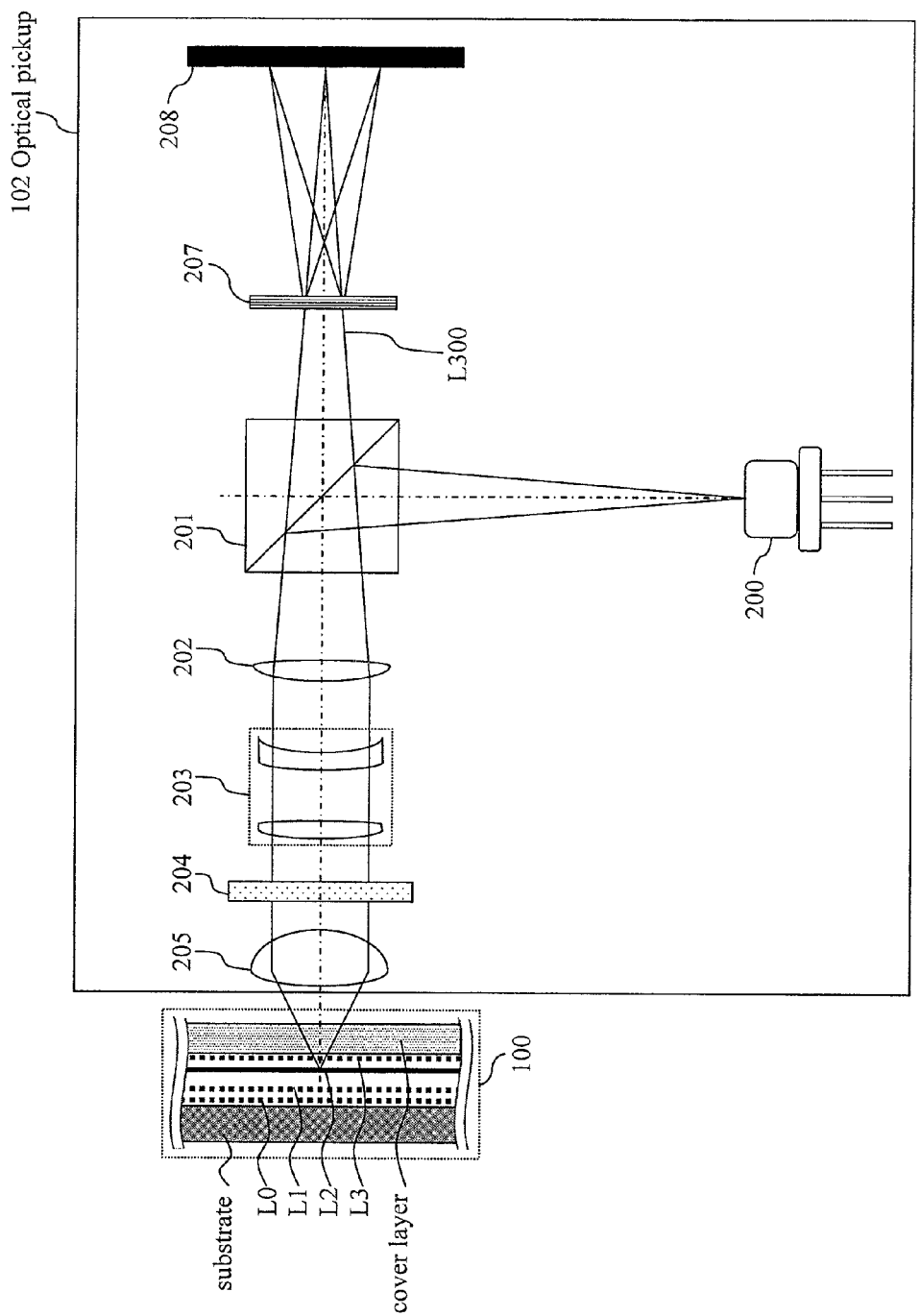
FIG. 4 is a schematic diagram showing a configuration of an optical pickup of Embodiments 1 to 3.

FIG. 4 is a diagram showing a schematic configuration of the optical pickup 102 according to the present invention, in a case where the optical disc 100 includes four information recording layers and the third layer (L2) from the substrate side is the target layer. In FIG. 4, the target layer (L2) is shown by a solid line and the non-target layers (L0, L1 and L3) are shown by broken lines.

An optical flux of s-polarized light emitted from the semiconductor laser 200 is reflected by a polarizing beam splitter (PBS) 201 in a direction perpendicular to the incident direction; the optical disc 100 exists in the perpendicular direction. The reflected light is converted into a collimated light by a collimating lens 202. The collimated incident light is changed in directivity of light by the beam expander 203, and converted from linearly polarized light to circularly polarized light by a ¼ wavelength plate 204. The incident light of the circularly polarized light is condensed by the objective lens 205. The optical disc 100 is irradiated by the condensed light. The beam expander 203 allows the focal position of the objective lens 205 to be adjusted onto a specific target layer among the recording layers.

Light reflected from the optical disc 100 is converted into parallel light again by the objective lens 205, and converted by the ¼ wavelength plate 204 from the circularly polarized light into linearly p-polarized light. The p-polarized light is converted into convergent light by the collimating lens 202. The reflected p-polarized light passes through the PBS 201, and diffracted to different directions by a diffraction optical element 207 according to the division and regions. The diffraction optical element 207 divides the reflected light L300 into a plurality of beams and diffracts the divided beams in the different directions at a one beam optical pickup for detecting TE and FE from the reflected light L300. The beams of the reflected light L300 divided by the diffraction optical element enters into the optical detector 208 including a plurality of detectors, and detected separately.

<Diffraction Optical Element>

The diffraction optical element 207 has a function as a diffraction grating, and divides the reflected light L300 into a plurality of beams and separately detects the divided beams, thereby generating RFS, FES and TES. Thus, the diffraction optical element 207 includes a plurality of regions and has a function of diffracting light beams to respective different directions.

Figure 5:
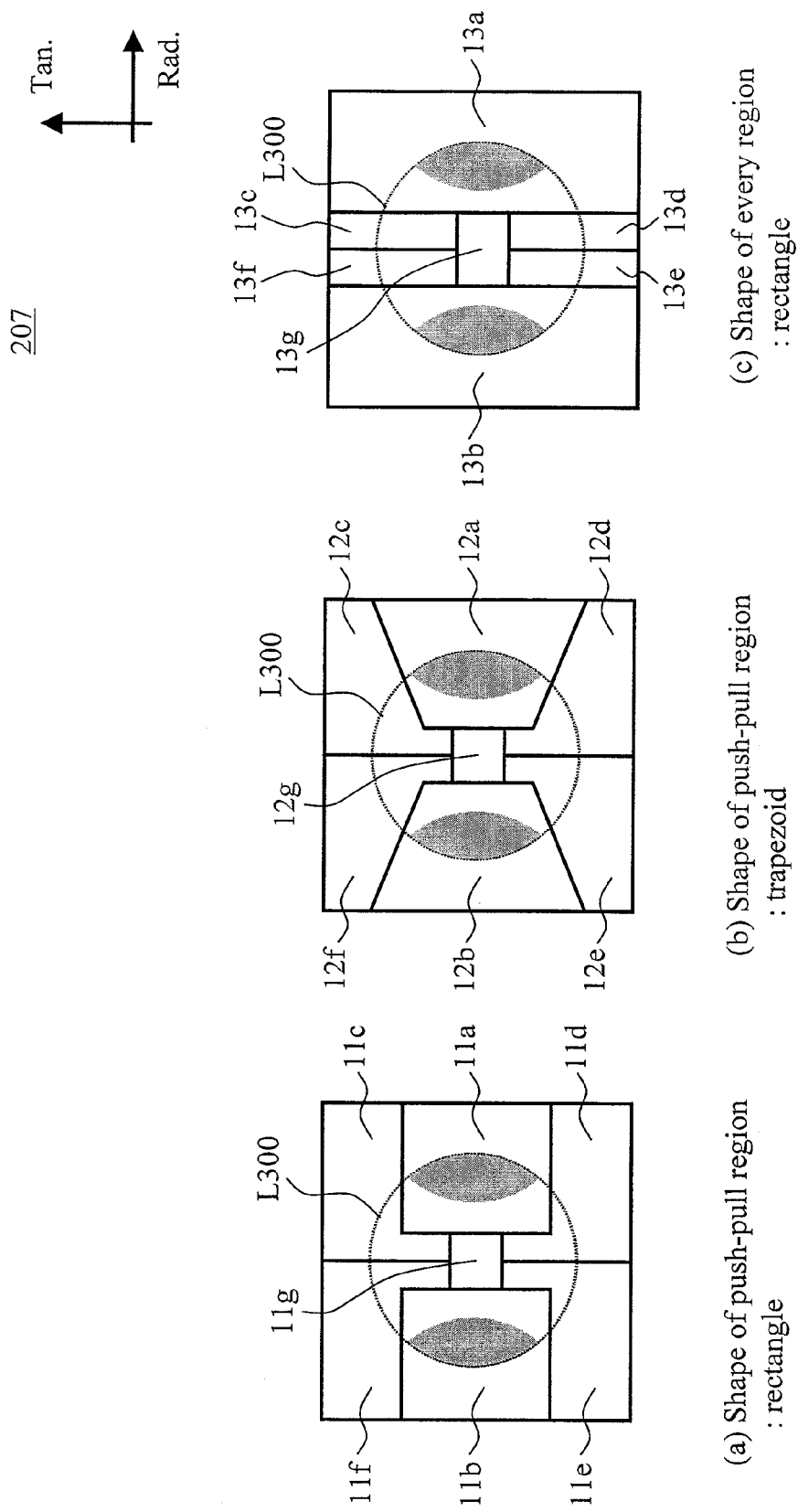
FIG. 5 is a schematic diagram showing a configuration of a diffraction optical element of Embodiment 1.

FIG. 5 shows a shape of the diffraction optical element 207 of Embodiment 1. The diffraction optical element 207 is divided into the regions that do not generate 0-order light, and solid lines show boundaries of the regions. Here, the vertical direction of the diffraction optical element 207 optically coincides with the tracking direction (Tan. direction) of the optical disc 100 and the lateral direction optically coincides with the radial direction (Rad. direction).

In FIGS. 5 (a) to (c), division shapes in the diffraction optical elements 207 are different from each other. In FIG. 5 (a), the shape including a PP pattern is a rectangle sufficiently larger than the PP pattern. In FIG. 5 (b), the shape including the PP pattern is a trapezoid. In FIG. 5 (c), every division shape in the diffraction optical element 207 is a rectangle. These configurations prevent the PP region of the reflected light L300 from leaking into a region for detecting FE. Here, the case of FIG. 5 (a) will be described. However, in FIGS. 5 (b) and (c), characteristics other than the division shapes of the regions are identical, and reference symbols 11a to 11g correspond to respective reference symbols 12a to 12g and respective reference symbols 13a to 13g.

A Broken line indicates reflected light L300. Solidly shaded regions at the right and left of the reflected light L300 indicate PP patterns generated by tracking of the optical disc 100. The PP patterns are interference patterns in the reflected light L300 caused by grooves of the optical disc 100 functioning as a diffraction grating. Since the PP pattern varies in response to variation in positional relationship between the objective lens 205 and the groove, the PP pattern becomes an AC component of TES. Since the regions other than the interference patterns in the reflected light L300 are not affected by the positional relationship between the objective lens 205 and the groove, the other regions become a DC component of TES. Both AC and DC components of TES are affected by a lens shift of the objective lens 205.

The regions 11a and 11b in FIG. 5 (a) are rectangles and disposed at positions at the right and the left of but except for a central region of the diffraction optical element 207. Light passing through these regions is +1-order-diffracted in the Tan. direction such that stray light from the non-target layers does not enter another light receiving element. The absolute value of the order of diffraction may be one or more and the order may have an inverse sign, only if the value is not zero. The light condensing position of the diffracted light becomes distant with reference to the light condensing position of the 0-order light in proportion to the absolute value of the order of diffraction. Thus, it is required to configure the detector according to the order of diffraction. The region 11a and 11b are divided such that the entire PP patterns in the reflected light L300 pass therethrough even in cases including a case where the objective lens 205 is shifted in the Rad. direction and a case where the diffraction optical element 207 moves to the Rad. direction or the Tan. direction. +1-order diffracted light in regions 11a and 11b is used as an AC component of TES in the DPP method. The regions 12a and 12b in FIG. 5 (b) are trapezoids. The regions 13a and 13b in FIG. 5 (c) are rectangles different in area from the regions 11a and 11b. The regions 12a and 12b and the region 13a and 13b are identical, in characteristics except for the shape, to the regions 11a and 11b.

The regions 11c to 11f in FIG. 5 (a) are disposed in the regions other than the central region 11g and the regions 11a and 11b in the diffraction optical element 207, and ±1-order-diffract stray light from the non-target layers in Tan. direction so as to be parallel to the Rad. direction and not to enter another light receiving element. The boundaries between regions 11c and 11f and the regions 11d and 11e are set such that reflected light L300 divided in a case where the centers of the reflected light L300 and the diffraction optical element 207 are coincide with each other substantially becomes a half thereof. +1-order diffracted light in regions 11c to 11f are used for detecting the DC component of TE in the DPP method and for detecting TE in the DPD method. −1-order diffracted light is used for detecting FE in a double knife edge method. Note that the sign of the order of diffraction may be inverted, and the absolute value of the order may be a different value of at least one. The light condensing position of the diffracted light becomes distant with reference to the light condensing position of the 0-order light in proportion to the absolute value of the order of diffraction. Thus, it is required to configure the detector according to the order of diffraction. The regions 12c to 12f in FIG. 5 (b) and the regions 13c to 13f in FIG. 5 (c) are diffraction gratings different in shape from the regions 11c to 11f. The regions 12c to 12f and regions 13c to 13f are identical, in characteristics except for the shape, to regions 11c to 11f.

The region 11g in FIG. 5 (a) is disposed in the central region including the center of the diffraction optical element 207, and +1-order-diffracts stray light from the non-target layers in the Rad. direction so as not to enter another light receiving element. In all the regions except for the region 11g, diffraction angles are set so as to condense light reflected from the target layer substantially at the centers of the respective light receiving elements or substantially at the center of the light receiving elements. The absolute value of the order of diffraction may be one or more and the order may have an inverse sign, only if the value is not zero. The light condensing position of the diffracted light becomes distant with reference to the light condensing position of the 0-order light in proportion to the absolute value of the order of diffraction. Thus, it is required to configure the detector according to the order of diffraction. The region 12g in FIG. 5 (b) and the region 13g in FIG. 5 (c) are regions other than the regions 12a to 12f and regions other than the regions 13a to 13f, respectively. The regions 12g and 13g are identical, in characteristics except for the shape, to region 11g.

The diffraction angles and the shapes of all the regions except for the region 11g in FIG. 5 (a), the region 12g in FIG. 5 (b) and the region 13g in FIG. 5 (c) are set so as to expand stray light reflected from the non-target layers, with which the optical detector 208 is irradiated in a defocusing state, in a direction where no light receiving element exists.

<Definition of Angle θ>

Figure 6:
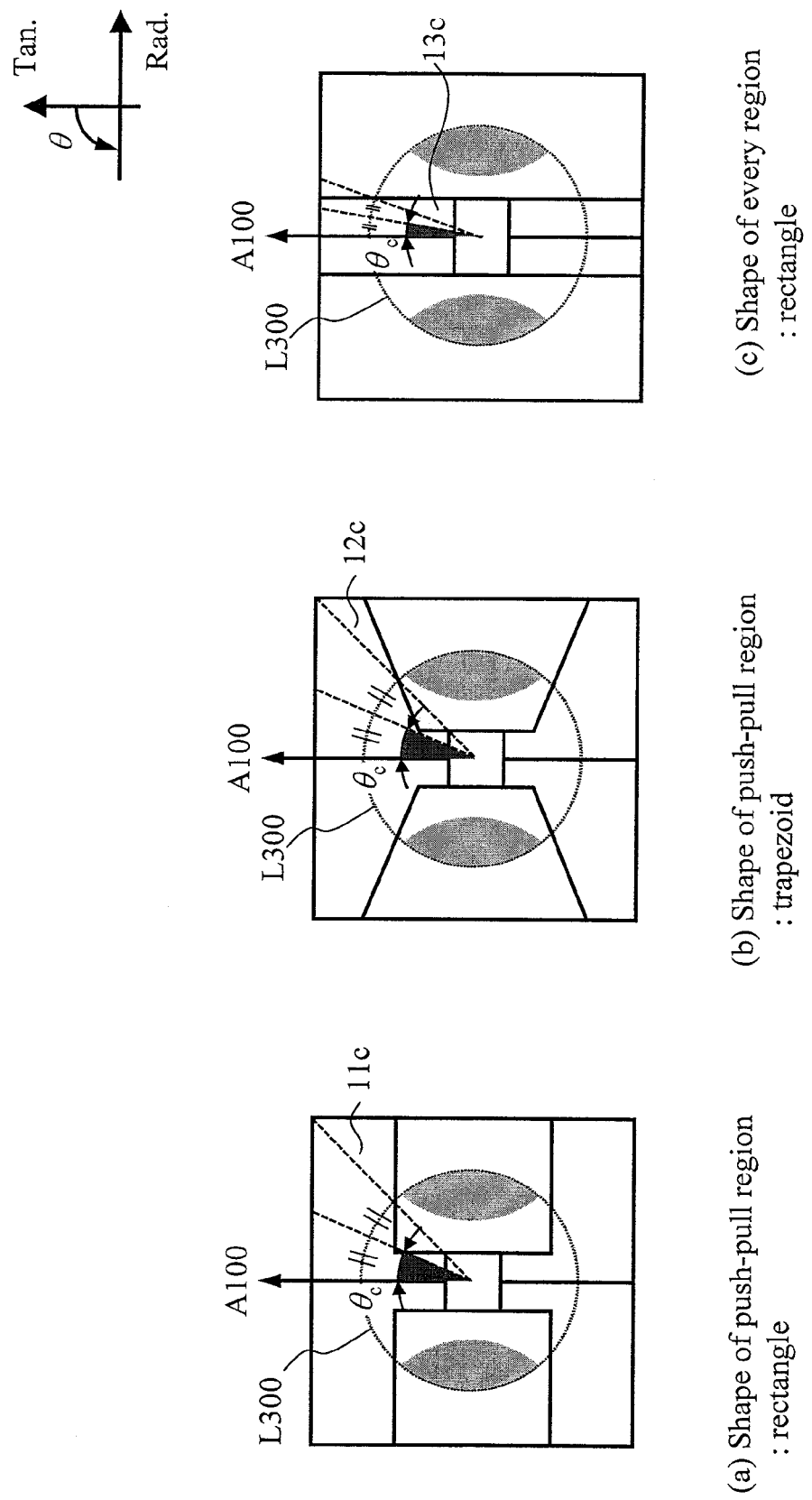
FIG. 6 is a schematic diagram showing a definition of a direction θ in which a spot of reflected light for an FE detection region of the diffraction optical element is widened.

FIGS. 6(a) to (c) show respective directions θ in which spherical aberrations are strongly caused when incident light is substantially condensed on a distant layer according to positions of the objective lens 205 with respect to the region 11c among the regions 11c to 11f in FIG. 5 (a), the region 12c among the regions 12c to 12f in FIG. 5 (b) and the region 13c among the regions 13c to 13f in FIG. 5 (c). In FIG. 6(a), angles θc to θf are between the axis A100 in the Tan. direction passing through the center of the reflected light L300 in the respective regions 11c, 11d, 11e and 11f and lines passing through the center of the reflected light L300 and the centers of the circular of arcs of the respective regions 11c to 11f. In FIG. 6(b), the angles θc to θf are between the axis A100 in the Tan. direction passing through the center of the reflected light L300 and lines passing through the center of the reflected light L300 and the centers of the circular of arcs of the respective regions 12c to 12f. In FIG. 6(c), the angles θc to θf are between the axis A100 in the Tan. direction passing through the center of the reflected light L300 and lines passing through the center of the reflected light L300 and the centers of the circular of arcs of the respective regions 13c to 13f. These angles θc to θf are collectively referred to as angle θ. FIG. 6(a) corresponds to the diffraction optical element 207 shown in FIG. 5 (a); FIG. 6(b) corresponds to that shown in FIG. 5 (b); and FIG. 6(c) corresponds to that shown in FIG. 5 (c). The counterclockwise direction of the angle θ is positive with reference to the axis A100. Accordingly, in the regions 11c to 13c and the regions 11e to 13e, angles θc and θe are negative; in the regions 11d to 13d and the regions 11f to 13f, angles θd and θf are positive.

<Configuration of Optical Detector and Signal Generation>

FIG. 7 shows a configuration of the optical detector 208 in Embodiment 1, and a light condensing position of light reflected from the target layer in the reflected light L300. Note that stray light from the non-target layers is not shown. The optical detector 208 includes a plurality of light receiving elements. Light receiving elements A10 to G10 are disposed at positions where light reflected from the target layer and divided and diffracted by the diffraction optical element 207 is condensed. As to a part of the reflected light, light receiving elements C11 and C12, D11 and D12, E11 and E12, and F11 and F12 are disposed so as to sandwich the light condensing position. The sizes of the entire light receiving elements A10 to G10 approximately correspond to the lens shift of the objective lens 205±several hundred μm, or a deviation of a part of the optical detector 208±several ten and are an extent of a size not to be irradiated with stray light from the non-target layers. At a point O100, a line extending from the optical axis of the reflected light L300 in the diffraction optical element 207 and a plane of the optical detector 208 cross each other.

In a case where all the optical axis of the reflected light L300, the diffraction optical element 207 and the point O100 on the optical detector 208 coincide with each other, +1-order diffracted light from the regions 11a to 11g of the diffraction optical element 207 is condensed at the centers of the light receiving elements A10 to G10, respectively, and −1-order light from the regions 11c to 11f is condensed at a midpoint between the light receiving elements C11 and C12, a midpoint between the elements D11 and D12, a midpoint between the elements E11 and E12 and a midpoint between the elements F11 and F12, respectively.

TES is generated on the basis of detection signals of the light receiving elements A10 to F10. RFS is generated on the basis of detection signals of the light receiving elements A10 to G10. FES is generated on the basis of detection signals of the light receiving elements C11 to F11 and C12 to F12.

Figure 2:
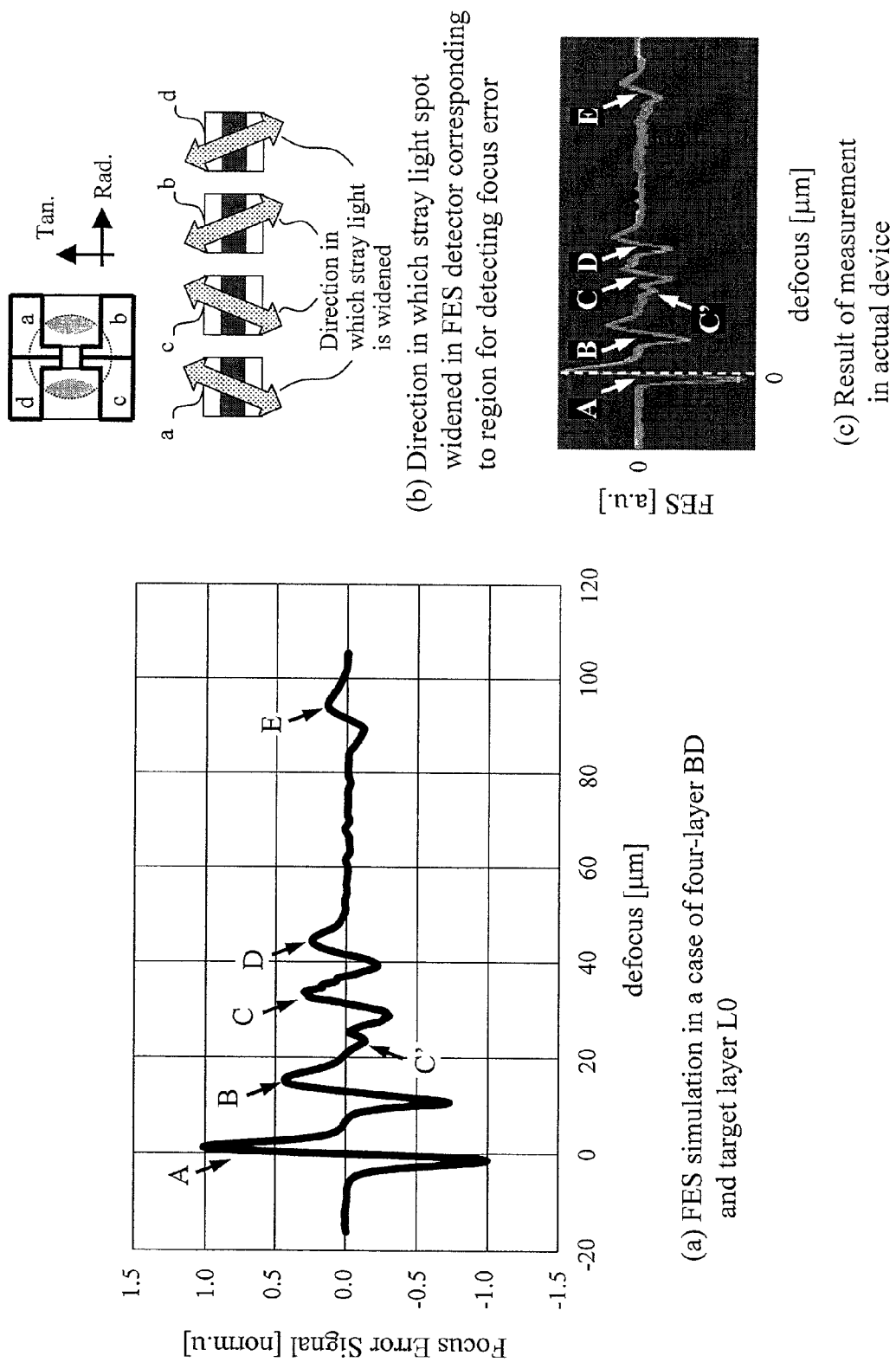
FIG. 2 is a diagram showing a problem to be solved by the present invention.
Figure 8:
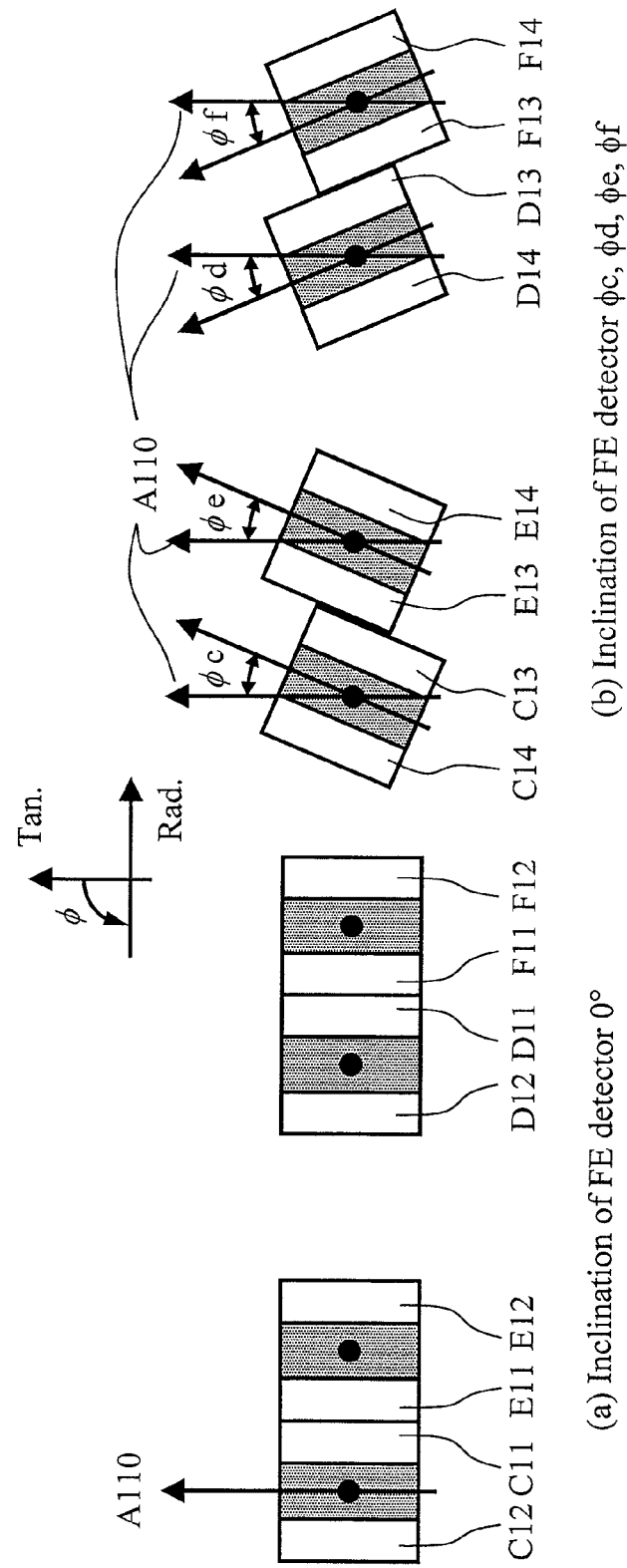
FIG. 8 is a schematic diagram showing a configuration of a detector for detecting FE in Embodiment 1.

FIG. 8 shows configurations of the light receiving elements for detecting FE in the optical detector 208. An axis A110 is in a direction where the axis optically coincides with the diffraction optical element 207 and the tangential direction (Tan. direction) of the optical disc 100 at the optical detector 208. As to angle φ between the longitudinal direction of the rectangle of the light receiving element and the axis A110, FIG. 8 (a) shows a case of 0° for all the FE light receiving elements, FIG. 8 (b) shows a case of an angle φc for the light receiving elements C13 and C14, a case of an angle φd for the light receiving elements D13 and D14, a case of an angle φe for the light receiving elements E13 and E14 and a case of an angle φf for the light receiving elements F13 and F14. The angles φc to φf are collectively referred to as φ, and the absolute values thereof are not necessarily be identical to each other. The counterclockwise direction of the angle φ is positive with reference to the axis A110. In Embodiment 1, the angle φ between the longitudinal direction of the rectangle of the light receiving element and the axis A110 in each FE light receiving element is $0 \leq \phi \leq 2\theta$. Accordingly, in a case where the position of the objective lens 205 substantially condenses the incident light on the distant layer, spherical aberration widens the spot in the θ direction, thereby reducing an adverse effect of leakage into the light receiving element and preventing FES from causing a quasi-peak. In FIG. 8 (b), it is preferable to arrange the longitudinal direction of the rectangle of the light receiving element in a direction substantially parallel to the direction in which the spot of the stray light in FIG. 2 (b) is widened. This is because the adverse effect of leakage into the light receiving element is most reduced.

FIG. 9 (a) shows a situation of stray light from the non-target layer disposed closer to an incident surface side than the target layer. FIG. 9 (b) shows a situation of stray light from the non-target layer disposed closer to a substrate side than the target layer. The reflected light L300 divided and diffracted by the diffraction optical element 207 except for a region including the optical axis of the reflected light L300 moves from the light condensing position when being focused, while being widened in Tan. or Rad. direction, according to the amount of defocusing. Therefore, the size and position of the light receiving element can be estimated from the situation of the stray light from the non-target layers in the detector 208, thereby allowing configurations of the diffraction optical element and the detector in which stray light hardly leaks into the light receiving element. In the configuration of the diffraction optical element 207 in FIG. 5 and the optical detector 208 in FIG. 7, as shown in FIGS. 9 (a) and (b), stray light from the non-target layers does not leak into the light receiving elements A10 to F10, C11 to F11 and C12 to F12, thereby allowing stably detecting FES and TES. The light receiving elements C11 to F11 and C12 to F12 of the detector for FE exert the advantageous effect that prevents stray light from leaking and is identical to that of the light receiving elements C13 to F13 and C14 to F14.

<TE Signal Generation in DPD Method>

$TES_{DPD}1$ in the DPD method can be acquired from detection signals of the light receiving elements C10 to F10 according to following Expression 1.

[Expression 1]

$$TES_{DPD}1 = C10 + E10 - (D10 + F10) \quad (1\text{-}1)$$

<TE Signal Generation in DPP Method>

$TES_{DPP}1$ in the DPP method can be acquired from detection signals of the light receiving elements A10 to F10 according to following Expression 2.

[Expression 2]

$$TES_{DPP}1 = (A10 - B10) - kt \times \{(C10 + D10) - (E10 + F10)\} \quad (1\text{-}2)$$

The second term is for reducing an offset of $TES_{DPP}1$ in a case where the objective lens 205 moves in the Rad. direction by tracking operation. A constant kt is a ratio of an amount of light in the region other than the central part and other than the push-pull region to the entire amount of light. Accordingly, the constant kt becomes larger in proportion to a ratio of areas of the regions 11c to 11f to the entire area of the diffraction grating. Thus, in order to suppress the kt value and reduce a TES offset error, it is suffice to increase a dispersion ratio of +1-order light to −1-order light in the regions 11c to 11f of the diffraction grating according to ratios of areas of the regions 11c to 11f. Here, the dispersion ratio of the +1-order light to the −1-order light has been described. According to a specification of the diffraction grating, analogous advantageous effects can be exerted for light with an inverse sign and n (2 or more)-order light.

<Recording/Reproducing RF Signal Generation>

RFS1 can be acquired from detection signals of the light receiving elements A10 to G10 according to following Expression 3.

[Expression 3]

$$RFS1 = A10 + B10 + C10 + D10 + E10 + F10 + G10 \quad (1\text{-}3)$$

The light receiving element G10 receives light in a region including the optical axis of the reflected light L300. Accordingly, this element simultaneously detects stray light from the non-target layers. However, since the intensity of the condensed signal light from the target layer is much higher than the intensity of the stray light from the non-target layers in the defocusing state, the adverse effect of the stray light on the light receiving element G10 is small. Since the light receiving elements A10 to F10 avoid the stray light, interlayer crosstalk in RFS in Embodiment 1 is small.

<FE Signal Generation>

FES is generated from a differential signal of the light receiving elements C11 and C12 for detecting FE and a differential signal of the elements D11 and D12, a differential signal of the elements E11 and E12 and a differential signal of the elements F11 and F12. In a case where the objective lens is focused on the target layer, all the differential signals become zero. Accordingly, FES becomes zero. In a case where the objective lens is defocused to the incident surface side, light according to the amount of defocusing is received by the light receiving elements C11 to F11. In a case of defocusing to the substrate side, the light according to the amount of defocusing is detected by the light receiving elements C12 to F12. Therefore, FES1 in Embodiment 1 can be acquired from detection signals of the light receiving elements C11 to F11 and C12 to F12 according to following Expression 4.

[Expression 4]

$$FES1 = C11 + D11 + E11 + F11 - (C12 + D12 + E12 + F12) \quad (1\text{-}4)$$

Even in a case where the light receiving elements C11 to F11 and C12 to F12 of the detector for FE have been turned by φc to φf in the elements C13 to F13 and C14 to F14, FES1' can be acquired according to following Expression 5.

[Expression 5]

$$FES1' = C13 + D13 + E13 + F13 - (C14 + D14 + E14 + F14) \quad (1\text{-}5)$$

Figure 10A:
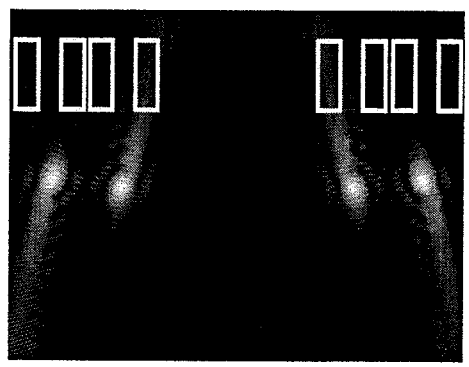
FIG. 10A is a diagram showing a simulation of stray light at an FE light receiving element in Embodiment 1.

FIGS. 10A to 10C show the results of the FE signal simulations in Embodiment 1. As conditions of the simulation, a four-layer BD, the L0 layer for the target layer, the diffraction grating 207 having the configuration shown in FIG. 5 (c), and all the angles φ of the FE light receiving elements shown in FIG. 8 (a) being 0° are adopted. FIG. 10A shows the FE light receiving element and an irradiation pattern in a case where light reflected from the non-target layer L2 is substantially condensed on the detector 208. The longitudinal directions of the rectangles of the light receiving elements have an inclination 0° from the Tan. direction, thereby avoiding the spot widened by the effect of spherical aberration. FIG. 10B is a result of the FES simulation in a case of on-tracking and the diffraction optical element 207 at a normal position without deviation of parts. FIG. 10C is a result thereof in a case of detracking by 80 nm and the diffraction optical element 207 having deviation of parts by 50 μm. (i) in FIGS. 10B and 10C show an intensity distribution of the reflected light L300 at the objective lens 205; (ii) show the position of the reflected light L300 in the diffraction grating 207; and (iii) show a result of FES simulation under the aforementioned conditions. According to the results of FIGS. 10B (iii) and 10C (iii), it is confirmed that the height of the quasi-peak C' appearing as the effect of spherical aberration is sufficiently reduced. As to the intensity distribution, the white indicates the maximum value and the black indicates the minimum value. These values are normalized by the maximum value in the intensity distribution. According to (i) in FIGS. 10B and 10C, while the lateral balance of the PP intensity is secured in the case of on-tracking, the lateral balance of the PP intensity is most disturbed in the case of causing detracking by 80 nm. (ii) in FIGS. 10B and 10C show the position of the reflected light L300 at the diffraction grating 207. Reference symbols O110 and O120 are the centers of the reflected light L300. Under the situations shown in FIG. 10C (ii), the center O120 deviates from the center of the diffraction grating 207, the reflected light intensity balance between the regions 13c and 13f and the regions 13d and 13e is disturbed. However, in the result of the FES simulation shown in (iii) of FIGS. 10B and 10C, there are no difference between both regions. It indicates that, even under the situations shown in FIG. 10C, the light of the PP region does not leak and normal FES is detected. According to this result, it can be known that FES is stably detected without leakage at PP region and the adverse effect of the spherical aberration on the distant layer.

Embodiment 2

Likewise, Embodiment 2 describes a case of the knife edge method A. It is provided that the inclination of the longitudinal direction of the strip of the optical detector for detecting FE is 0<φ≦2θ with reference to the axis in the Tan. direction. This configuration prevents the light spot widened on the surface of the detector 208 due to the spherical aberration in a case where the objective lens 205 is at and around the position where the focus is on the non-target layer from leaking into the optical detector.

Figure 12:
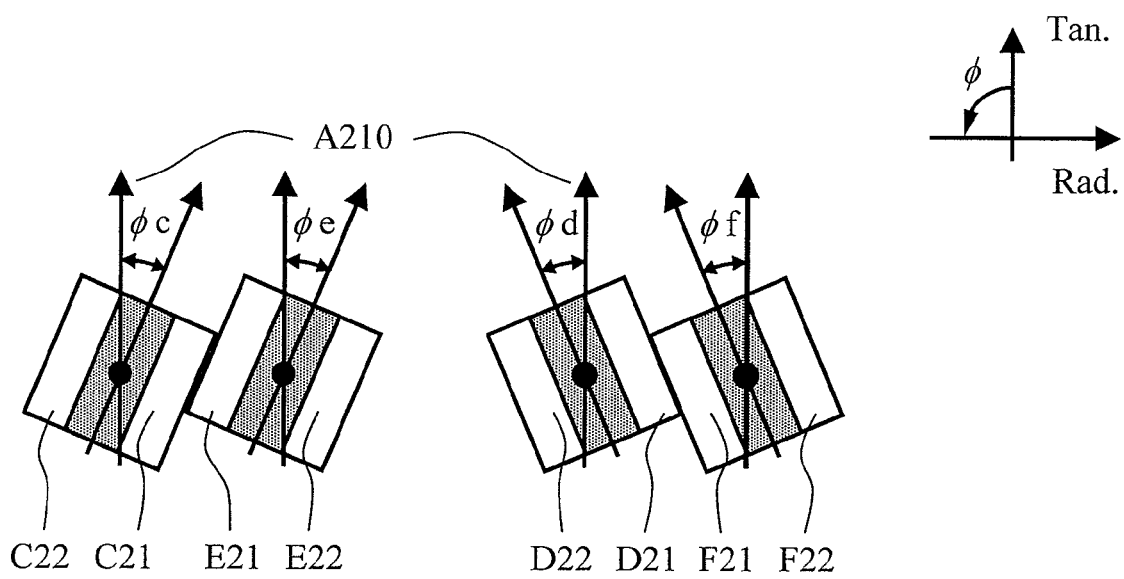
FIG. 12 is a schematic diagram showing a configuration of a detector for detecting FE in Embodiment 2.

FIGS. 11 to 13 pertain to Embodiment 2. Elements corresponding to those of Embodiment 1 shown in FIGS. 3 to 8 are indicated by the identical symbols. The configurations of the optical information recording apparatus 1, the optical pickup 102 and the diffraction optical element 207, the definition of the angle θ, and generation of TES and RFS are identical to those of Embodiment 1. Accordingly, the description thereof is omitted.

<Configuration of Optical Detector and Signal Processing>

FIG. 11 shows a configuration of an optical detector 208, and a light condensing position of light reflected from the target layer in the reflected light L300 in Embodiment 2. However, stray light from the non-target layers is not shown. Configurations of light receiving elements A10 to G10 of the optical detector 208 are identical to those in Embodiment 1. Accordingly, the description thereof is omitted.

In a case where all the optical axis of the reflected light L300, the diffraction optical element 207, the point O100 on the optical detector 208 coincide with each other, +1-order diffracted light beams from the regions 11a to 11g of the diffraction optical element 207 shown in FIG. 5 are condensed at the center of the light receiving elements A10 to G10, respectively, and −1-order light beams from the regions 11c to 11f are condensed the midpoint between the light receiving element C21 and C22, the midpoint between the elements D21 and D22, the midpoint between the elements E21 and E22 and the midpoint between the elements F21 and F22, respectively.

FIG. 12 shows configurations of light receiving elements for detecting FE in the optical detector 208, and a case where the angle φ between the longitudinal direction of the rectangle of the light receiving element and the axis A210 in the Tan. direction is φc between the light receiving elements C21 and C22, φd between the light receiving elements D21 and D22, φe between the light receiving elements E21 and E22 and φf between the light receiving elements F21 and F22. The angles φc to φf are collectively referred to as angle φ, and the absolute values thereof are not necessarily be identical to each other. The counterclockwise direction of the angle φ is positive with reference to the axis A210. In Embodiment 2, the angle φ between the longitudinal direction of the rectangle of the light receiving element and the axis A210 in the Tan. direction in each FE light receiving element is 0<φ≦2θ. Accordingly, in a case where the position of the objective lens 205 substantially condenses the incident light on the distant layer, spherical aberration widens the spot in the θ direction, thereby reducing an adverse effect of leakage into the light receiving element and preventing FES from causing a quasi-peak.

<FE Signal Generation>

FES is generated from a differential signal of the light receiving elements C21 and C22 for detecting FE and a differential signal of the elements D21 and D22, a differential signal of the elements E21 and E22 and a differential signal of the elements F21 and F22. In a case where the objective lens is focused on the target layer, all the differential signals become zero. Accordingly, FES becomes zero.

In a case where the objective lens is defocused to the incident surface side, light according to the amount of defocusing is received by the light receiving elements C21 to F21. In a case of defocusing to the substrate side, the light according to the amount of defocusing is detected by the light receiving elements C22 to F22. Therefore, FES can be acquired from detection signals of the light receiving elements C21 to F21 and C22 to F22 according to following Expression 6.

[Expression 6]

$$FES2 = C21 + D21 + E21 + F21 - (C22 + D22 + E22 + F22) \quad (2\text{-}1)$$

FIG. 13 shows a result of the FE signal simulation in Embodiment 2. As conditions of the simulation, a four-layer BD, the L0 layer for the target layer, the diffraction grating 207 having the configuration shown in FIG. 5 (c), and the angles φ of the FE light receiving elements shown in FIG. 12 including angle φc=φe=−5.0° and φd=φf=+5.0° are adopted. FIG. 13 (a) shows the FE light receiving element and an irradiation pattern in a case where light reflected from the non-target layer L2 is substantially condensed on the detector 208. The longitudinal directions of the rectangles of the light receiving elements have inclinations φc to φf from the Tan. direction, thereby avoiding the spot widened by the effect of spherical aberration. FIG. 13 (b) is a result of the FES simulation in a case of on-tracking and the diffraction optical element 207 at a normal position without deviation of parts. FIG. 13 (c) is a result thereof in a case of detracking by 80 nm and the diffraction optical element 207 having deviation of parts by 50 μm. While the lateral balance of the PP intensity is secured in the case of on-tracking, the lateral balance of the PP intensity is most disturbed in the case of causing detracking by 80 nm. However, in the result of the FES simulation shown in FIGS. 13 (b) and 13 (c), there are no difference between both regions. It indicates that the light of the PP region does not leak and normal FES is detected. According to this result, it can be known that FES is stably detected without leakage at PP region and the adverse effect of the spherical aberration on the distant layer. Further, in Embodiment 2, the inclination φ of the light receiving element of the FE detector does not include 0°. This allows expansion of the spot due to spherical aberration to be easily avoided. Accordingly, in comparison with FES shown in FIGS. 10b (iii) and 10c (iii) in Embodiment 1, it can be confirmed that, in the results of the FES simulations in FIGS. 13 (b) and 13 (c), the effect of spherical aberration (C') to be caused between the peaks B and C is further reduced than that in Embodiment 1. Since the description on TES and RFS is identical to that in Embodiment 1, the description is omitted.

Embodiment 3

Embodiment 3 describes a case of generating FES from the PP region in the reflected light L300 from the optical disc 100, that is, a case of the knife edge method B.

Figure 15:
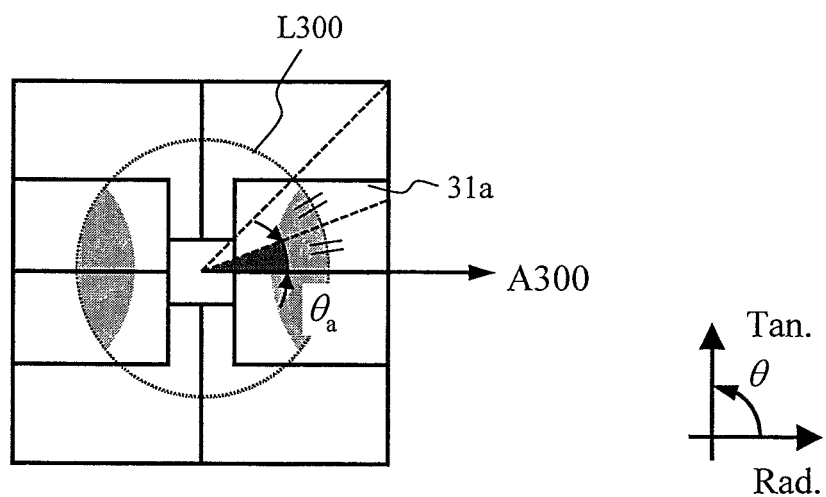
FIG. 15 is a schematic diagram of a definition of a direction θ in which a spot of reflected light for an FE detection region of the diffraction optical element is widened.

As shown in FIG. 15, provided that the axis A300 in the Rad. direction passing through the center of the reflected light and a line passing through the center of a circular arc of a continuous reflected light region for detecting FE is e, spherical aberration is strongly caused at and around θ direction. In Embodiment 3, it is provided that, in the light receiving element of the optical detector for FE, the inclination of the longitudinal direction of the strip is $0 < \phi \leq 2\theta$ with reference to the axis in the Tan. direction. According to this configuration, in a case where the position of the objective lens 205 substantially condenses the incident light on the distant layer, spherical aberration widens the spot on the detector 208, thereby reducing an adverse effect of leakage into the light receiving element of the optical detector.

FIGS. 14 to 17 pertain to Embodiment 3. Elements corresponding to those of Embodiment 1 shown in FIGS. 3 to 8 are indicated by the identical symbols. The configurations of the optical information recording apparatus 1 and the optical pickup 102 are identical to those of Embodiment 1. Accordingly, the description thereof is omitted.

<Diffraction Optical Element>

The diffraction optical element 207 has a function as a diffraction grating, and divides the reflected light L300 into a plurality of beams and separately detects the divided beams, thereby generating RFS, FES and TES. Thus, the diffraction optical element 207 includes a plurality of regions and has a function of diffracting light beams to respective different directions.

Figure 14:
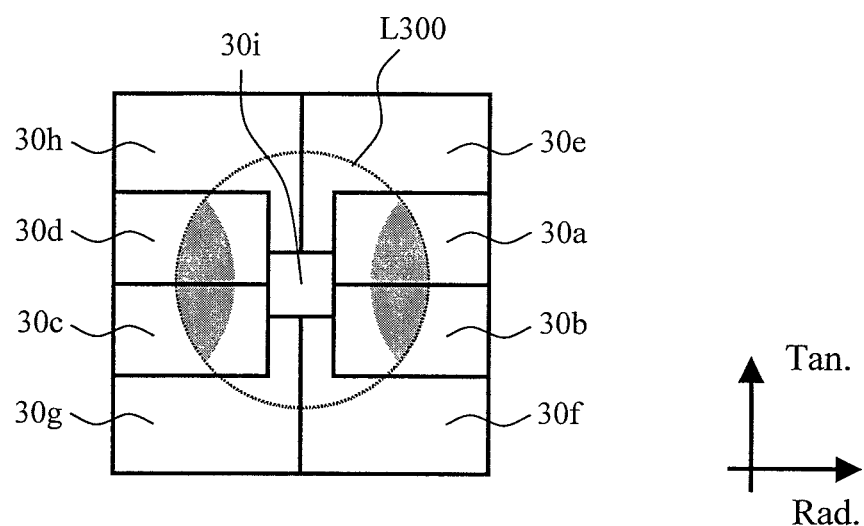
FIG. 14 is a schematic diagram showing a configuration of a diffraction optical element of Embodiment 3.

FIG. 14 shows a shape of the diffraction optical element 207 in Embodiment 3. The diffraction optical element 207 is divided into the regions that do not generate 0-order light for addressing interlayer crosstalk, and solid lines show boundaries of the regions.

Regions 30a to 30d in FIG. 14 are rectangles, and disposed at the right and left of but except for the central region of the diffraction optical element 207. The boundaries between the regions 30a and 30b and between the regions 30c and 30d are set such that the reflected light L300 to be divided in a case where the reflected light L300 and the center of the diffraction optical element 207 coincide with each other substantially becomes a half thereof. The regions 30a to 30d are divided such that the entire PP patterns in the reflected light L300 pass therethrough in cases including a case where the objective lens 205 is shifted in the Rad. direction and a case where the diffraction optical element 207 moves in the Rad. direction or the Tan. direction. The light beams passing through the regions 30a to 30d are ±1-order-diffracted in the Tan. direction such that stray light from the non-target layers does not enter another light receiving element. The absolute value of the order of diffraction may be one or more or the order may have an inverse sign, only if the value is not zero. The light condensing position of the diffracted light becomes distant with reference to the light condensing position of the 0-order light in proportion to the absolute value of the order of diffraction. Thus, it is required to configure the detector according to the order of diffraction. The +1-order diffracted light in regions 30a to 30d is used for the AC component of TE in the DPP method. The −1-order diffracted light is used for detecting FE in the double knife edge method.

The regions 30e to 30h in FIG. 14 are disposed in regions other than the central region 30i and the regions 30a to 30d of the diffraction optical element 207. Each region ±1-order-diffracts the stray light from the non-target layer in the Tan. direction so as to be parallel to the Rad. direction, so as not to enter another light receiving element. The boundaries between the regions 30e and 30f and the regions 30g and 30h are set such that the reflected light L300 to be divided in a case where the reflected light L300 and the center of the diffraction optical element 207 coincide with each other substantially becomes a half thereof. The +1-order diffracted light beams in the regions 30e to 30h are used for detecting the DC component of TE in the DPP method. The −1-order diffracted light beams are used for detecting TE in the DPD method. The order of diffraction has an inverse sign. The absolute value of the order may be a different number that is at least one. The light condensing position of the diffracted light becomes distant with reference to the light condensing position of the 0-order light in proportion to the absolute value of the order of diffraction. Thus, it is required to configure the detector according to the order of diffraction.

The region 30i in FIG. 14 is disposed in a central region including the center of the diffraction optical element 207, and +1-order diffracts the optical flux in the Rad. direction such that the stray light from the non-target layer does not enter another light receiving element. In all the regions except for the region 30i, diffraction angles are set so as to condense light reflected from the target layer substantially at the centers of the respective light receiving elements or substantially at the center of the light receiving elements. The absolute value of the order of diffraction may be one or more or the order may have an inverse sign, only if the value is not zero. The light condensing position of the diffracted light becomes distant with reference to the light condensing position of the 0-order light in proportion to the absolute value of the order of diffraction. Thus, it is required to configure the detector according to the order of diffraction.

The diffraction angles and the shapes of all the regions except for the region 30i in FIG. 14 are set so as to expand stray light reflected from the non-target layers, with which the optical detector 208 is irradiated in a defocusing state, in a direction where no light receiving element exists.

<Definition of Angle θ>

FIG. 15 shows a direction θa at which spherical aberration is strongly caused when the incident light is substantially condensed on a distant layer according to positions of the objective lens 205 with respect to the region 30a among the regions 30a to 30d in FIG. 14 used for detecting FE. The directions in which spherical aberration is strongly caused in the regions 30b to 30d correspond to the angles θb to θd, respectively. The angles are between the axis A300 in the Rad. direction passing through the center of the reflected light L300 and the line passing through the center of the reflected light L300 and the centers of the circular arcs of the regions 30a to 30d. The angles θa to θd are collectively referred to as an angle θ. The counterclockwise direction of the angle θ is positive with reference to the axis A300. Accordingly, in the regions 30a and 30c, the angles θa and θc are positive, and, in the regions 30b and 30h, the angles θb and θh are negative.

<Configuration of Optical Detector and Signal Generation>

FIG. 16 shows a configuration of the optical detector 208 in Embodiment 3, and a light condensing position of light reflected from the target layer in the reflected light L300. Note that stray light from the non-target layers is not shown. The optical detector 208 includes a plurality of light receiving elements. Light receiving elements A30 to I30 are disposed at positions where light reflected from the target layer and divided and diffracted by the diffraction optical element 207 is condensed. As to a part of the reflected light, light receiving elements A31 and A32, B31 and B32, C31 and C32 and D31 and D32 are disposed so as to sandwich the light condensing position. The sizes of the entire light receiving elements A30 to I30 approximately correspond to the lens shift of the objective lens 205±several hundred μm, or a deviation of a part of the optical detector 208±several ten μm, and are an extent of a size not to be irradiated with stray light from the non-target layers. At a point O300, a line extending from the optical axis of the reflected light L300 in the diffraction optical element 207 and a plane of the optical detector 208 cross each other.

In a case where all the optical axis of the reflected light L300, the diffraction optical element 207 and the point O300 on the optical detector 208 coincide with each other, +1-order diffracted light from the regions 30a to 30i of the diffraction optical element 207 is condensed at the centers of the light receiving elements A30 to I30, respectively; −1-order light from the regions 30e to 30h is condensed at the centers of the light receiving elements E31 to H31, respectively; and −1-order light from the light receiving element 30a to 30d is condensed at the midpoint between the light receiving elements A31 and A32, the midpoint between the elements B31 and B32, the midpoint between the elements C31 and C32 and the midpoint between the elements D31 and D32.

TES in the DPP method is generated on the basis of detection signals of the light receiving elements A30 to H30. TES in the DPD method is generated on the basis of detection singles of the light receiving elements E31 to H31. RFS is generated on the basis of detection signals of the light receiving elements A30 to I30. FES is generated on the basis of detection signals of the light receiving elements A31 to D31 and A32 to D32.

Figure 17:
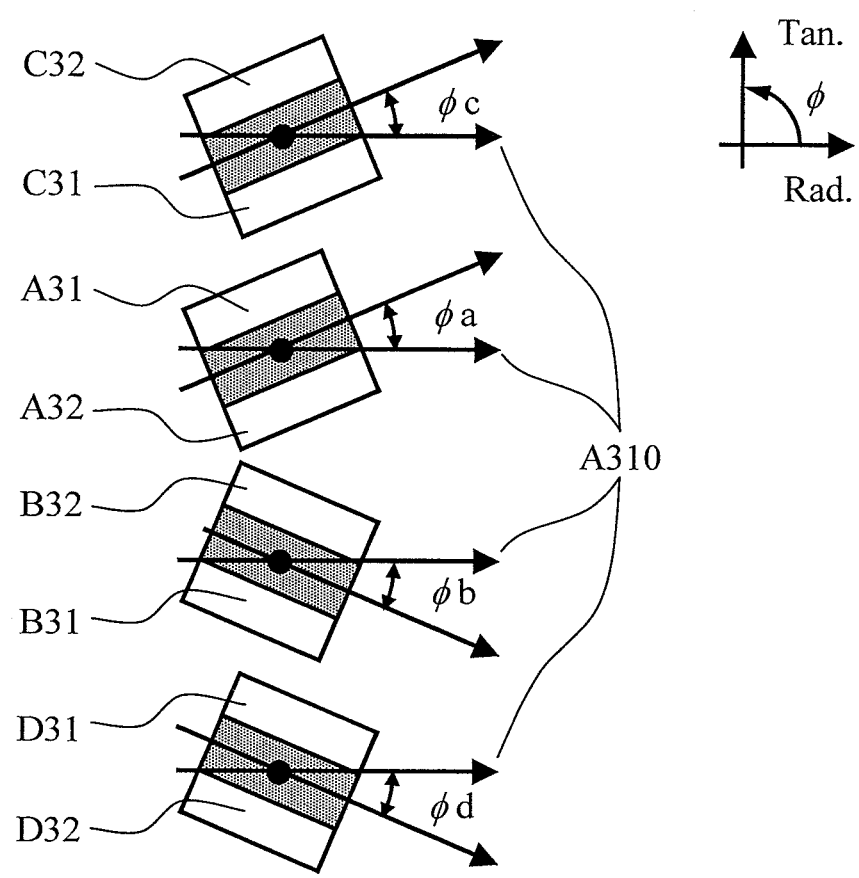
FIG. 17 is a schematic diagram showing a configuration of a detector for detecting FE in Embodiment 3.

FIG. 17 shows a configuration of a light receiving element for detecting FE in the optical detector 208. An axis A310 is an axis of a direction in which the axis substantially optically coincides with the tangential direction (Rad. direction) of the optical disc 100 in the optical detector 208. As to the angle φ between the longitudinal direction of the rectangle of the light receiving element and the axis A310, FIG. 17 shows a case of an angle φa for the light receiving elements A31 and A32, a case of an angle φb for the light receiving elements B31 and B32, a case of an angle φc for the light receiving elements C31 and C32 and a case of an angle φd for the light receiving elements D31 and D32. The angles φa to φd are collectively referred to as an angle φ, the absolute values thereof are not necessarily be identical to each other. The counterclockwise direction of the angle φ is positive with reference to the axis A310. In Embodiment 3, the angle φ between the longitudinal direction of the rectangle of the light receiving element and the axis A310 in each FE light receiving element is $0 < \phi \leq 2\theta$. Accordingly, in a case where the position of the objective lens 205 substantially condenses the incident light on the distant layer, spherical aberration widens the spot in the θ direction, thereby reducing an adverse effect of leakage into the light receiving element and preventing FES from causing a quasi-peak.

<TE Signal Generation in DPD Method>

$TES_{DPD}3$ in the DPD method can be acquired from detection signals of the light receiving elements E31 to H31 according to following Expression 7.

[Expression 7]

$$TES_{DPD}3 = E31 + G31 - (F31 + H31) \tag{3-1}$$

<TE Signal Generation in DPP Method>

$TES_{DPP}3$ in the DPP method can be acquired from detection signals of the light receiving elements A30 to H30 according to following Expression 8.

[Expression 8]

$$TES_{DPP}3 = (A30 + B30 - C30 - D30) - kt \times \{(E30 + F30) - (G30 + H30)\} \tag{3-2}$$

Here, a constant kt is set so as not to cause an offset in the $TES_{DPP}3$ in a case where the objective lens 205 moves in the Rad. direction according to tracking movement.

<Recording/Reproducing RF Signal Generation>

RFS3 can be acquired from detection signals of the light receiving elements A30 to I30 according to following Expression 9.

[Expression 9]

$$RFE3 = A30 + B30 + C30 + D30 + E30 + F30 + G30 + H30 + I30 \tag{3-3}$$

The light receiving element I30 receives light in a region including the optical axis of the reflected light L300. Accordingly, this element simultaneously detects stray light from the non-target layers. However, since the intensity of the condensed signal light from the target layer is much higher than the intensity of the stray light from the non-target layers in the defocusing state, the adverse effect of the stray light on the light receiving element I30 is small. Since the light receiving elements A30 to H30 avoid the stray light, interlayer crosstalk in RFS in Embodiment 3 is small.

<FE Signal Generation>

FES is generated from a differential signal of the light receiving elements A31 and A32 for detecting FE and a differential signal of the elements B31 and B32, a differential signal of the elements C31 and C32 and a differential signal of the elements D31 and D32. In a case where the objective lens is focused on the target layer, all the differential signals become zero. Accordingly, FES becomes zero. In a case where the objective lens is defocused to the incident surface side, light according to the amount of defocusing is received by the light receiving elements A31 to D31. In a case of defocusing to the substrate side, the light according to the amount of defocusing is detected by the light receiving elements A32 to D32. Therefore, FES3 in Embodiment 3 can be acquired from detection signals of the light receiving elements A31 to D31 and A32 to D32 according to following Expression 10.

[Expression 10]

$$FES3 = A31 + B31 + C31 + D31 - (A32 + B32 + C32 + D32) \quad (3\text{-}4)$$

Since the result of the simulation of FES3 is identical to that in Embodiment 2, the description thereof is omitted.

Embodiment 4

Embodiment 4 describes a case of adopting the SSD method for detecting FE from the optical disc 100.

Provided that an angle between an axis A400 in the Tan. direction passing through the center of the reflected light and a line passing through the center of the reflected light L300 and the center of circular arc of the divided reflected light region is angle θ, spherical aberration is strongly caused at and around θ direction. In Embodiment 4, the light receiving elements are divided in a plural manner in the light receiving element of the optical detector for FE and it is provided that the inclination of the longitudinal direction of the strip is $0 \leq \phi \leq 2\theta$ with reference to the axis in the Tan. direction. This configuration prevents the stray light spot widened on the surface of the detector 208 due to the spherical aberration from leaking into the light receiving element of the optical detector, in a case where the position of the objective lens 205 substantially condenses the incident light on the distant layer.

FIGS. 18 to 21 pertain to Embodiment 4. Elements corresponding to those of Embodiment 1 shown in FIGS. 3 to 8 are indicated by the identical symbols. Since the configuration of the optical information recording apparatus 1 is identical to that of Embodiment 1, the description thereof is omitted.

<Configuration of Optical Pickup>

Figure 18:
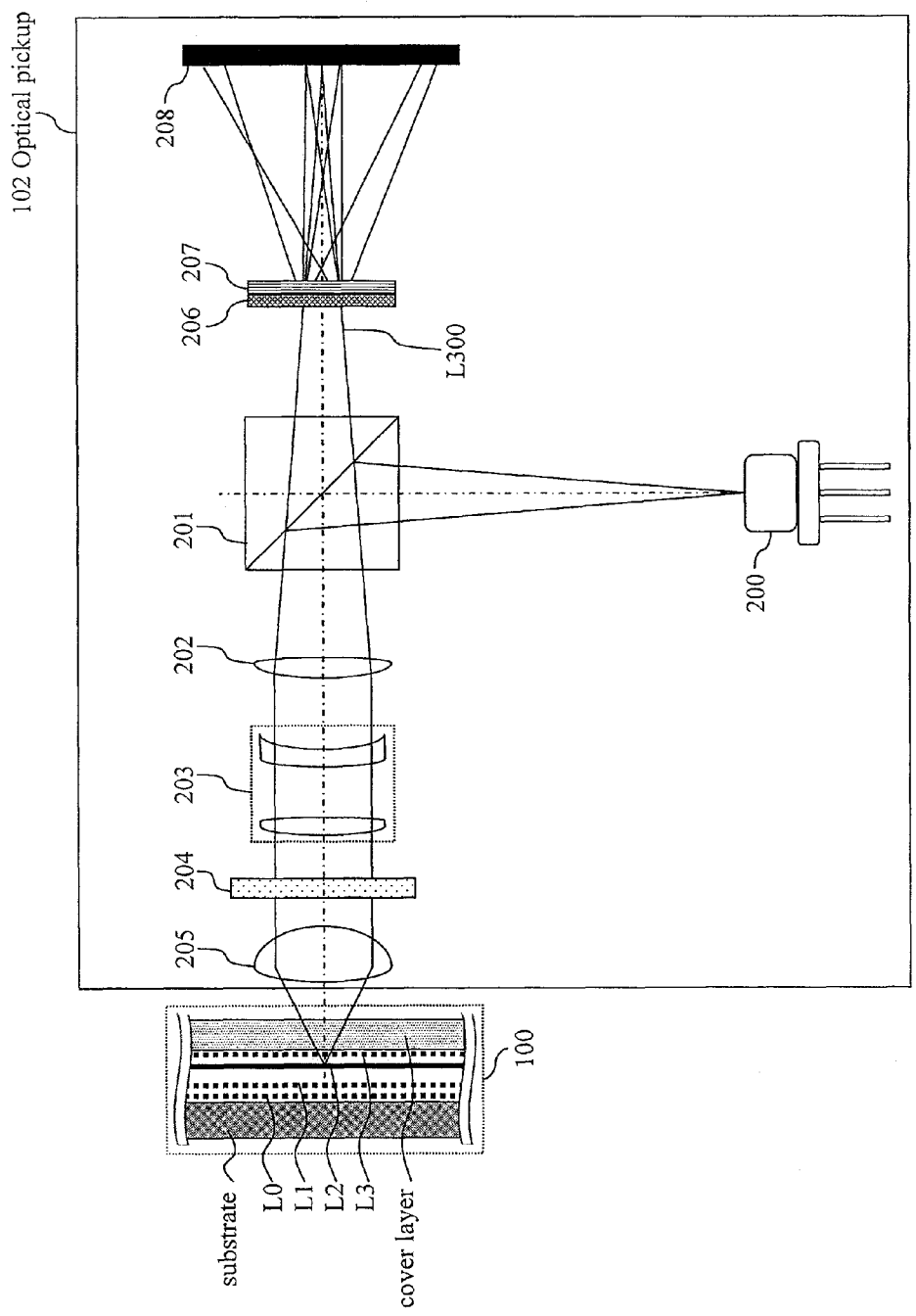
FIG. 18 is a schematic diagram showing a configuration of an optical pickup in Embodiment 4.

FIG. 18 shows a schematic configuration of an optical pickup 102 in Embodiment 4. A point different from that in Embodiments 1 to 3 are that a hologram element 206 exists for executing the SSD method for detecting FE. The hologram element 206 has a function of changing the focal positions of light beams having been divided into three, or a 0-order light beam, ±1-order diffracted light beams, according to the order. The 0-order light beam is condensed on the detector 208 and used for detecting TES and RFS. The +1-order light and −1-order light beams are detected on the optical detector 208 in defocusing states and used for generating FES. The focal positions of the ±1-order light beams diffracted by the hologram element 206 are separated into the front and the rear of the optical detector 208. FE is detected from variation of defocusing balance of the two light beams.

The optical path and conditions before the hologram element 206 and from the diffraction optical element 207 to the optical detector 208 are identical to those of Embodiment 1. Accordingly, the description thereof is omitted.

<Diffraction Optical Element>

The diffraction optical element 207 has a function as a diffraction grating, and divides the reflected light L300 into a plurality of beams and separately detects the divided beams, thereby generating RFS, FES and TES. Thus, the diffraction optical element 207 includes a plurality of regions and has a function of diffracting light beams to respective different directions.

Figure 19:
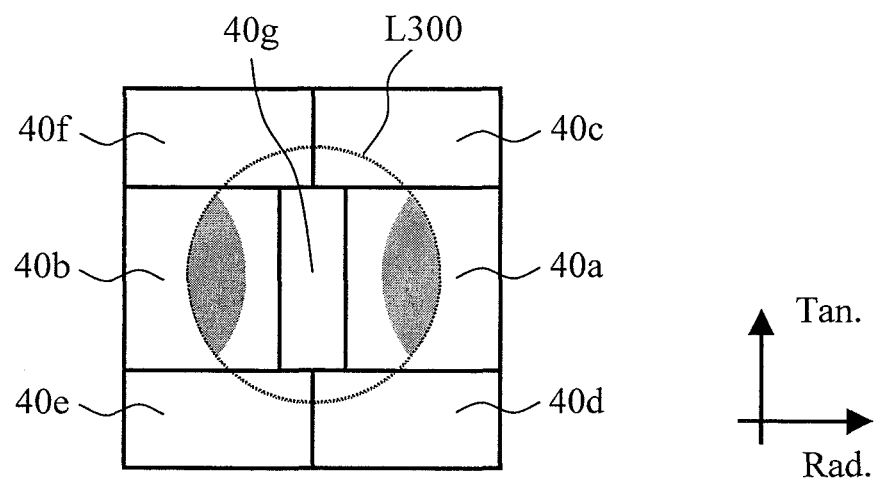
FIG. 19 is schematic diagram showing a configuration of a diffraction optical element in Embodiment 4.

FIG. 19 shows a shape of the diffraction optical element 207 of Embodiment 4. Solid lines in this diagram show boundaries of the regions. A broken line indicates reflected light L300. Solidly shaded regions at the right and left of the reflected light L300 indicate PP patterns generated by tracking of the optical disc 100.

Regions 40a and 40b in FIG. 19 are rectangles, and disposed at the right and left of but except for the central region of the diffraction optical element 207. Light passing through the regions is +1-order-diffracted in the Rad. direction to a different position. The diffraction direction may be the Tan. direction. The absolute value of the order of diffraction may be one or more or the order may have an inverse sign, only if the value is not zero. The regions 40a and 40b are divided such that the entire PP patterns in the reflected light L300 pass therethrough even in cases including a case where the objective lens 205 is shifted in the Rad. direction and a case where the diffraction optical element 207 is moved in the Rad. direction or the Tan. direction. The +1-order diffracted light in the regions 40a and 40b is used as an AC component of TES in the DPP method.

The regions 40c to 40f in FIG. 19 are disposed in regions except for the central region 40g and the regions 40a and 40b of the diffraction optical element 207, and +1-order-diffract light in directions different from each other. The absolute value of the order of diffraction may be one or more or the order may have an inverse sign, only if the value is not zero. The boundaries between regions 40c and 40f and the regions 40d and 40e are set such that reflected light L300 divided in a case where the centers of the reflected light L300 and the diffraction optical element 207 are coincide with each other substantially becomes a half thereof. +1-order diffracted light in regions 40c to 40f are used for detecting the DC component of TE in the DPP method and for detecting TE in the DPD method. It is suffice that the regions 40c to 40f have areas sufficient for securing S/N ratios required for TES in detection of TE in the DPD method. The order of diffraction may have an inverse sign. The absolute values of the orders may be numbers at least one and different from each other.

The region 40g in FIG. 19 is disposed in a central region including the center of the diffraction optical element 207. The order of this region is not limited in contrast to that of another region, and may be zero. In all the regions, the diffraction angles are set such that light reflected from the target layer is condensed substantially at the center of the respective light receiving element.

<Definition of Angle θ>

Figure 20:
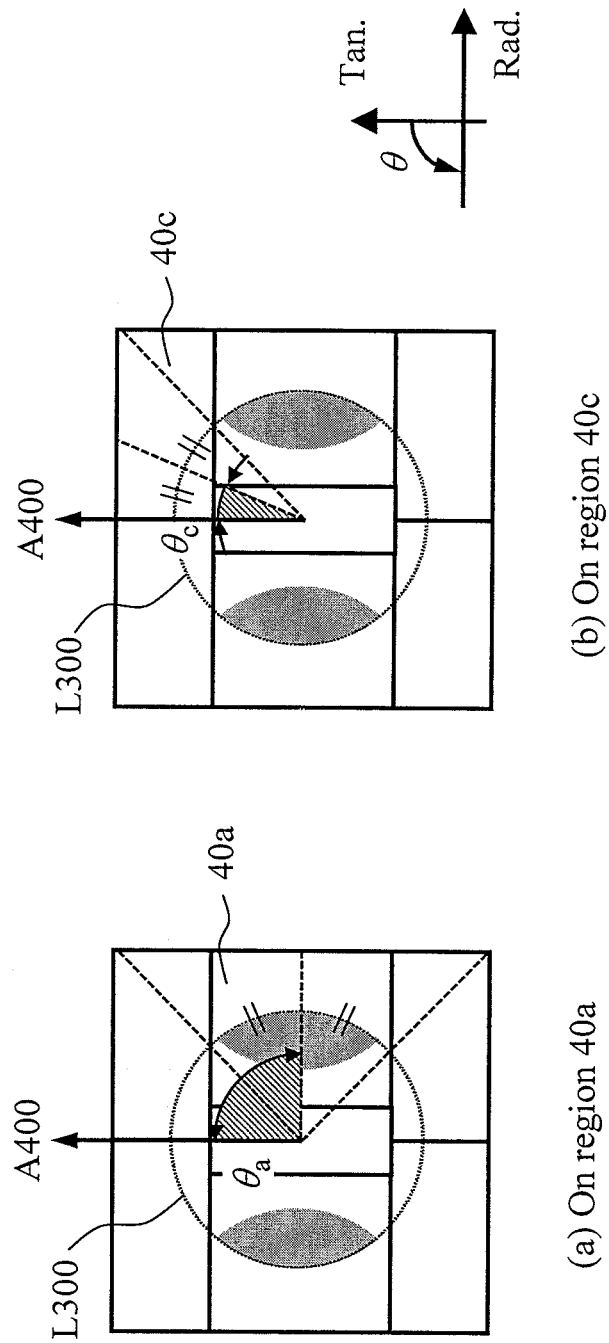
FIG. 20 is a schematic diagram of a definition of a direction θ in which a spot of reflected light for an FE detection region of the diffraction optical element is widened.

FIGS. 20 (a) and 20 (b) show respective directions θa and θc in which spherical aberrations are strongly caused when incident light is substantially condensed on a distant layer according to positions of the objective lens 205 with respect to the regions 40a and 40c among the regions 40a to 40g in the diffraction grating 207. Angles θa to θf are between an axis A400 in the Tan. direction passing through the center of the reflected light L300 and lines passing through the centers of circular arcs of the regions 40a to 40f. The angles θa to θf are collectively referred to as an angle θ. The counterclockwise direction of the angle θ is positive with reference to the axis A400. Accordingly, in the regions 40c and 40e, angles θc and θe are negative, and, in the regions 40d and 40f, angles θd and θf are positive. In a case of Embodiment 4, the angles θa and θb are 90°. Accordingly, spherical aberration is caused in the Rad. direction. Since the region 40g is the central region of the reflected light L300, spherical aberration is not strongly caused. Accordingly, a conventional detection method may be adopted.

<Configuration of Optical Detector and Signal Generation>

Figure 21:
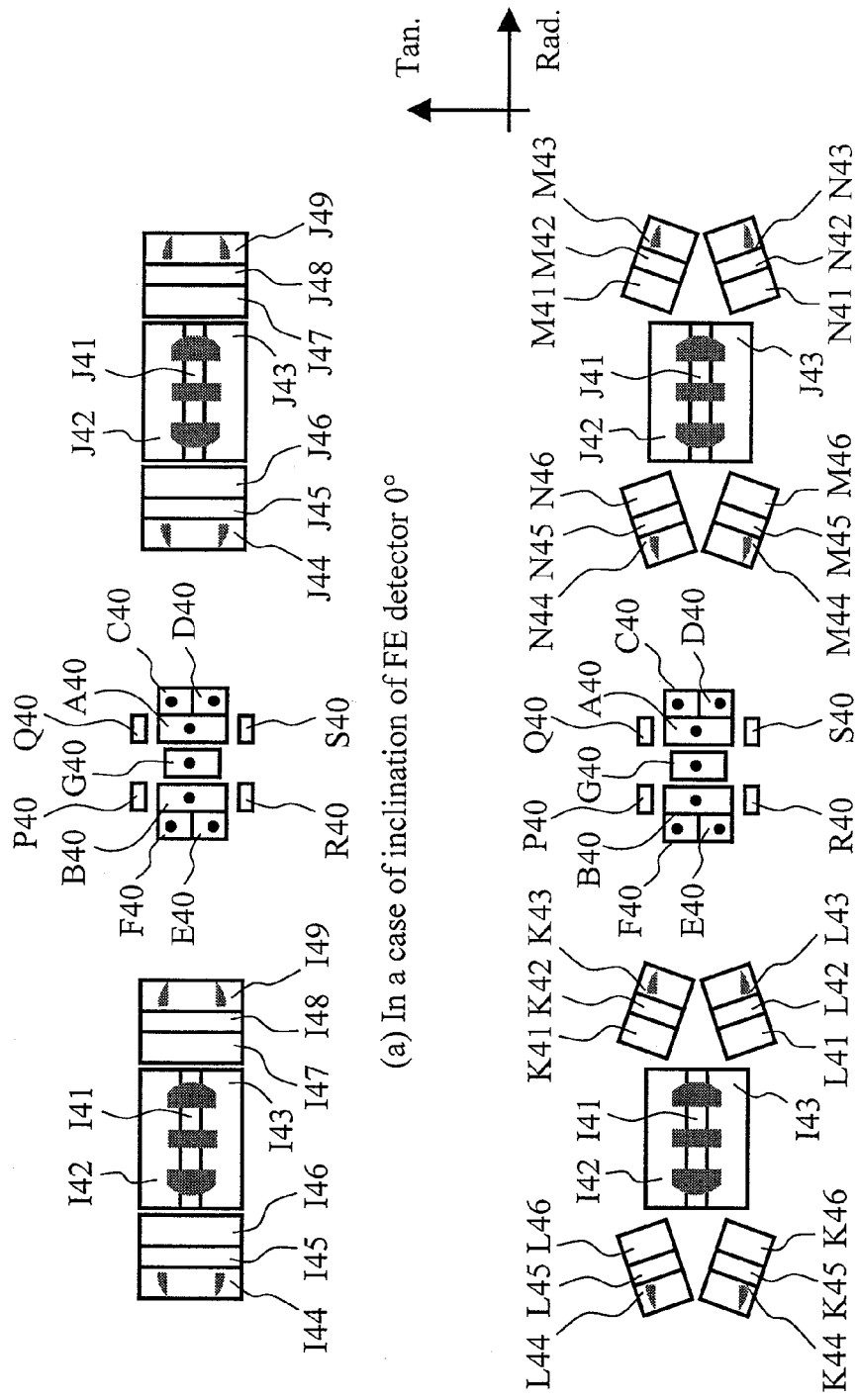
FIG. 21 is schematic diagram showing a configuration of a detector of Embodiment 4.

FIGS. 21 (a) and 21 (b) show a configuration of the optical detector 208 in Embodiment 4 and a light condensing position of light reflected from the target layer in the reflected light L300. FIG. 21 (a) shows a case where an inclination of the light receiving element of the FE detector receiving light having passed through the regions 40c to 40f is 0°. FIG. 21 (b)

shows a case where the inclination is not 0°. Note that stray light from the non-target layers is not shown. In FIGS. 21 (a) and 21(b), corresponding elements are indicated by identical symbols. The optical detector 208 includes a plurality of light receiving elements. Light receiving elements A40 to G40 are disposed at positions where light reflected from the target layer and divided and diffracted by the diffraction optical element 207 is condensed. The sizes of the entire light receiving elements A40 to G40 approximately correspond to the lens shift of the objective lens 205±several hundred μm, or a deviation of a part of the optical detector 208±several ten μm.

TES is generated on the basis of detection signals in the light receiving elements A40 to F40. RFS is generated on the basis of detection signals in the light receiving elements A40 to G40. FES is generated on the basis of detection signals in the light receiving elements I41 to I49 and J41 to J49.

Detectors P40, Q40, R40 and S40 in FIGS. 21 (a) and 21 (b) detect stray light from the non-target layers. An amount of stray light leaking into the detectors A40 and B40 is calculated by multiplying detection signals of the detectors P40, Q40, R40 and S40 by respective coefficients according to areas and positions thereof. Embodiment 4 employs the SSD method for detecting FE. Accordingly, it is difficult to adopt a configuration in which the positions of the stray light and the light receiving element of the optical detector are different from each other in contrast to Embodiments 1 to 3, because such a configuration leads to significantly increase the size of the optical pickup. Thus, a detector for stray light is prepared for the light receiving element for detecting TE, which is particularly susceptible to the stray light, a stray light component of light received by the detector for the signal light is acquired from the detection signal, and subtraction is performed, thereby reducing interlayer crosstalk. The configuration of an optical pickup that accommodates a multilayer optical disc and adopts the SSD method is described in JP 2008-287851A.

Figure 22:
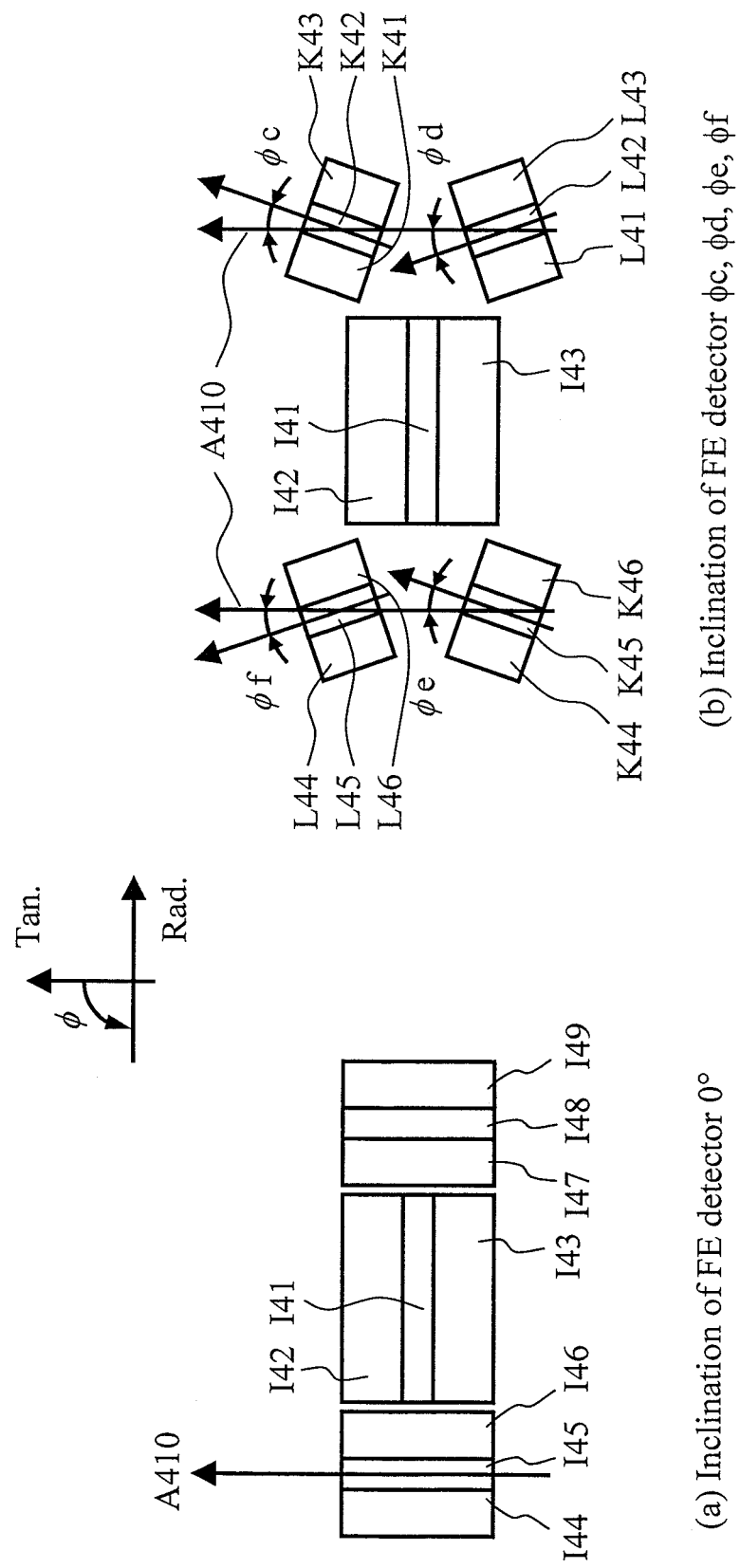
FIG. 22 is a schematic diagram showing a configuration of a detector for detecting FE in Embodiment 4.

FIG. 22 shows configurations of light receiving elements for detecting FE in the optical detector 208. As to angles ϕ between the longitudinal directions of the rectangles and an axis A410, FIG. 22 (a) shows a case of 0° for all the FE light receiving elements, and FIG. 22 (b) shows a case of ϕc for light receiving elements K41 to K43, ϕd for light receiving elements L41 to L43, ϕe for light receiving elements K44 to K46 and ϕf for light receiving elements L44 to L46. The angles ϕc to ϕf are collectively referred to as an angle ϕ, and the absolute values thereof are not necessarily be identical to each other. The counterclockwise direction of the angle ϕ is positive with reference to the axis A410. Although not shown, the detectors J41 to J49 correspond to the detectors I41 to I47 in FIG. 21 (a), respectively, and the detectors M41 to M46 and N41 to N46 correspond to the detectors K41 to K46 and L41 to L46 in FIG. 21 (b), respectively. In Embodiment 4, the angle ϕ between the longitudinal direction of the rectangle of the light receiving element in each FE light receiving element and the axis A410 is 0≦ϕ≦2θ. Accordingly, in a case where the position of the objective lens 205 substantially condenses the incident light on the distant layer, spherical aberration widens the spot in the θ direction, thereby reducing an adverse effect of leakage into the light receiving element and preventing FES from causing a quasi-peak.

<TE Signal Generation in DPD Method>

$TES_{DPD}4$ in the DPD method can be acquired from detection signals of the light receiving elements C40 to F40 according to following Expression 11.

[Expression 11]

$$TES_{DPD}4 = C40 + E40 - (D40 + F40) \quad (4\text{-}1)$$

<TE Signal Generation in DPP Method>

$TES_{DPP}4$ in the DPP method can be acquired from detection signals of the light receiving elements A40 to F40 and detection signals of the stray light detectors P40 to S40 according to following Expression 12.

[Expression 12]

$$TES_{DPP}4 = A40 - B40 - kt \times \{(C40 + D40) - (E40 + F40)\} - ks \times \{(Q40 + S40) - (P40 + R40)\} \quad (4\text{-}2)$$

Here, a constant kt is set so as not to cause an offset in $TES_{DPP}4$ in a case where the objective lens 205 moves in the Rad. direction by tracking operation. A constant ks is determined from areas and positions of the stray light detectors P40 to S40 with respect to areas and positions of the PP region optical detectors A40 and B40. The intensity of a stray light component leaking into the detectors A40 and B40 is acquired by multiplying detection signals of detectors P40 to S40 for stray light by the constant ks.

<Recording/Reproducing RF Signal Generation>

RFS4 can be acquired from the detection signals of the light receiving elements A40 to G40 and the detection signals of the stray light detectors P40 to S40 according to following Expression 13.

[Expression 13]

$$RFS4 = A40 + B40 + C40 + D40 + E40 + F40 + G40 - ks \times \{(Q40 + S40) - (P40 + R40)\} \quad (4\text{-}3)$$

<FE Signal Generation>

FES4 is acquired from a balance between the sizes of reflected light of the light receiving elements I41 to I49 and J41 to J49 for detecting FE.

[Expression 14]

$$FES4 = I41 + I42 + I43 + I45 + I48 + J44 + J46 + J47 + J49 - (J41 + J42 + J43 + J45 + J48 + I44 + I46 + I47 + I49) \quad (4\text{-}4)$$

FES4' in a case where the light receiving elements K41 to K46, L41 to L46, M41 to M46, N41 to N46 of the detector for FE is inclined by angles ϕc to ϕf can be acquired according to following Expression 15.

[Expression 15]

$$FES4' = I41 + J42 + J43 + K42 + K45 + L42 + L45 + M42 + M45 + N42 + N45 - (J41 + I42 + I43 + K41 + K43 + K44 + K46 + L41 + L43 + L44 + L46 + M41 + M43 + M44 + M46 + N41 + N43 + N44 + N46) \quad (4\text{-}5)$$

Results of the simulations of FES4 and FES4' are identical to those in Embodiment 1. Accordingly, the description thereof is omitted.

Embodiment 5

Likewise, Embodiment 5 describes a case of the SSD method, in which it is provided that, in the optical detector for detecting FE, the inclination ϕ of the longitudinal direction of the strip is 0<ϕ≦2θ with reference to the axis in the Tan. direction. This configuration prevents leakage of a light spot widened on the surface of the detector 208 due to the spherical aberration into the optical detector in a case where the objective lens 205 is at or around the position of focusing on the non-target layer.

Figure 23:
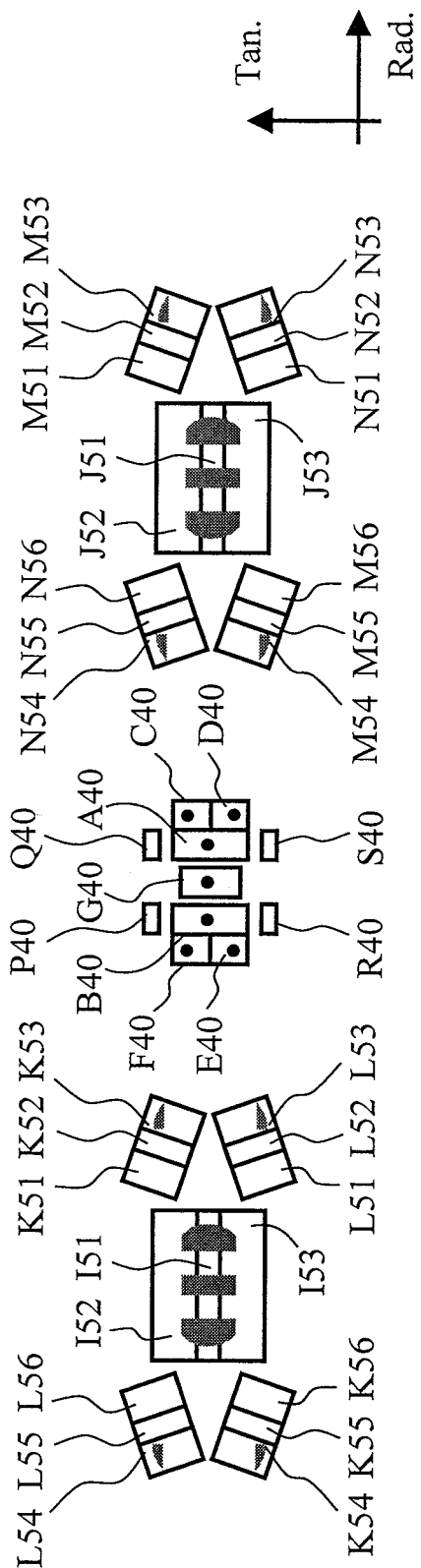
FIG. 23 is a schematic diagram showing a configuration of a detector of Embodiment 5.
Figure 24:
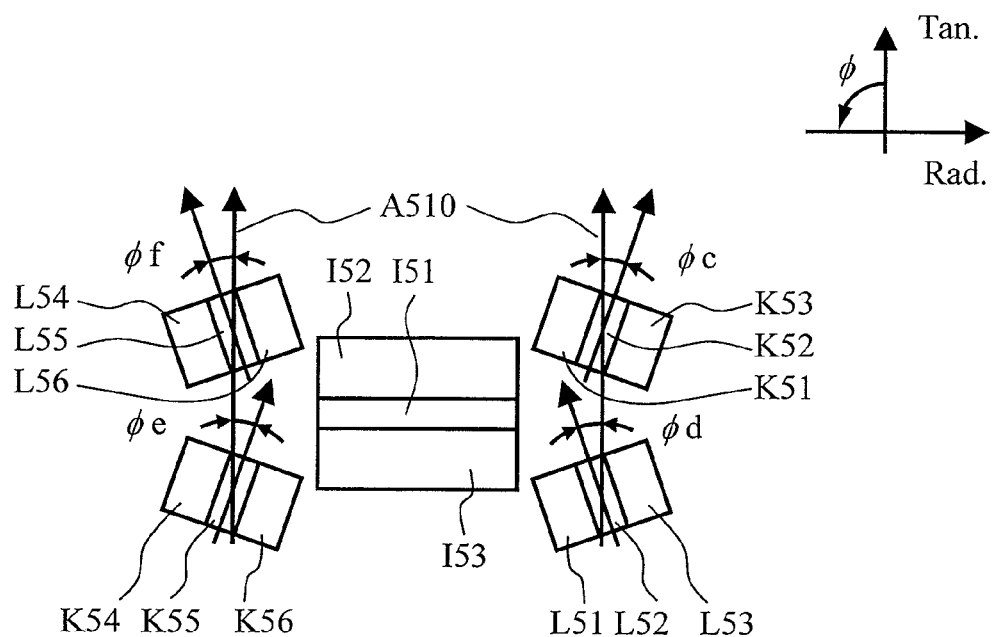
FIG. 24 is a schematic diagram showing a configuration of a detector for detecting FE in Embodiment 5.

FIGS. 23 and 24 pertain to Embodiment 5. Elements corresponding to those of Embodiment 1 shown in FIGS. 3 to 8 and corresponding to Embodiment 4 shown in FIGS. 18 to 20 are indicated by the identical symbols. The configurations of the optical information recording apparatus 1, the optical pickup 102 and the diffraction optical element 207, the definition of the angle θ and generation of TES and RFS are identical to those of Embodiment 1. Accordingly, the description thereof is omitted.

<Configuration of Optical Detector and Signal Processing>

FIG. 23 shows a configuration of an optical detector 208 and a light condensing position of light reflected from the target layer in the reflected light L300 in Embodiment 5. However, stray light from the non-target layers is not shown. Corresponding elements in FIG. 23 are indicated by identical symbols. The optical detector 208 includes a plurality of light receiving elements. Light receiving elements A50 to G50 are disposed at positions where light reflected from the target layer having been divided and diffracted by the diffraction optical element 207 is condensed. The sizes of the entire light receiving elements A50 to G50 approximately correspond to the lens shift of the objective lens 205±several hundred μm, or a deviation of a part of the optical detector 208±several ten μm.

TES is generated on the basis of detection signals of the light receiving elements A50 to F50. RFS is generated on the basis of detection signals of the light receiving elements A50 to G50. FES is generated on the basis of detection signals of the light receiving elements I51 to I59 and J51 to J59.

The detectors P50, Q50, R50 and S50 in FIG. 23 detect stray light from the non-target layers. An amount of stray light leaking into the detectors A50 and B50 is calculated by multiplying detection signals of the detectors P50, Q50, R50 and S50 by respective coefficients according to areas and positions thereof.

FIG. 24 shows a configuration of the light receiving element for detecting FE in the optical detector 208. As to the angle φ between the longitudinal direction of the rectangle of the light receiving element and an axis A510, FIG. 24 shows a case of φc for light receiving elements K51 to K53, a case of φd for light receiving elements L51 to L53, a case of φe for light receiving elements K54 to K56 and a case of φf for light receiving elements L54 to L56. The angles φc to φf are collectively referred to as φ, and the absolute values thereof are not necessarily identical to each other. The counterclockwise direction of the angle φ is positive with reference to the axis A510. Although not shown, detectors M51 to M56 and N51 to N56 correspond to the detectors K51 to K56 and L51 to L56 in FIG. 24, respectively. In Embodiment 5, it is provided that the angle φ between the longitudinal direction of the rectangle of each FE light receiving element and the axis A510 is 0<φ≦2θ. Accordingly, in a case where the position of the objective lens 205 substantially condenses the incident light on the distant layer, spherical aberration widens the spot in the θ direction, thereby reducing an adverse effect of leakage into the light receiving element and preventing FES from causing a quasi-peak.

<FE Signal Generation>

FES5 can be acquired from detection signals of the light receiving elements K51 to K56, L51 to L56, M51 to M56 and N51 to N56 according to Expression 16.

[Expression 16]

FES5=I51+J52+J53+K52+K55+L52+L55+M52+M55+N52+N55−(J51+I52+I53+K51+K53+K54+K56+L51+L53+L54+L56+M51+M53+M54+M56+N51+N53+N54+N56)  (5-1)

A result of the simulation of FES5 is identical to that in Embodiment 2. Accordingly, the description thereof is omitted. In Embodiment 5, the inclination φ of the light receiving element of the FE detector does not include 0°. This allows expansion of the spot due to spherical aberration to be easily avoided. Accordingly, reduction in spherical aberration is more improved in comparison with Embodiment 4. TES and RFS are identical to those in Embodiment 4. Accordingly, the description thereof is omitted.

Figure 25:
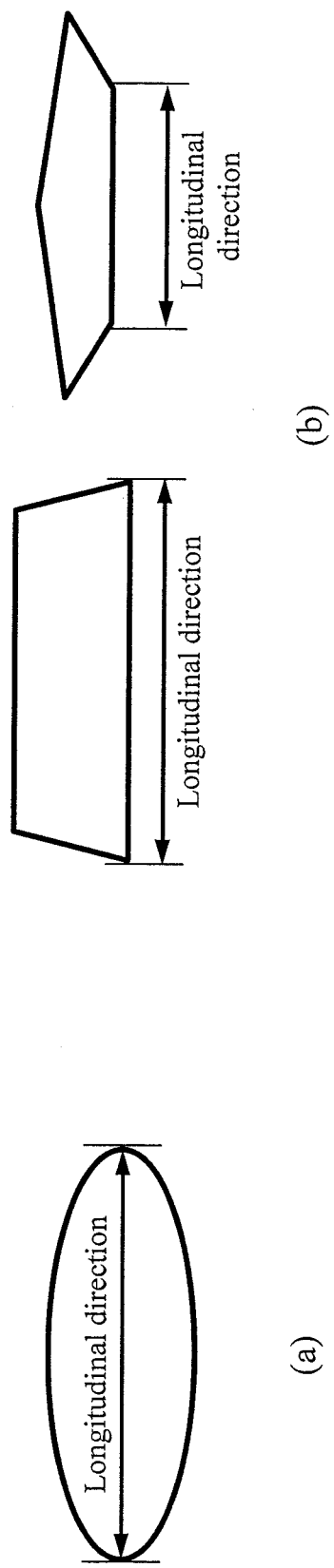
FIG. 25 is a diagram illustrating a shape of a light receiving element.

In the embodiments, it is described that every light receiving element is rectangular. As shown in FIG. 25, it is a matter of course that the shape is not limited to a rectangle. Instead, an ellipse, a trapezoid and a polygon with at least three apexes may also be adopted. In this case of an ellipse, the major axis of the ellipse is referred to as the longitudinal direction (FIG. 25 (a)). In the case of a polygon, the longest side is referred to as the longitudinal direction (FIG. 25 (b)).

DESCRIPTION OF SYMBOLS 1 optical information recording and reproducing apparatus
100 optical disc
101 laser driver
102 optical pickup
103 signal processing circuit
104 demodulation circuit
105 decoding circuit
106 address detection circuit
107 servo circuit
108 drive control circuit
109 system controller
110 actuator
111 spindle motor
200 semiconductor laser
201 polarizing beam splitter
202 collimating lens
203 beam expander
204 ¼ wavelength plate
205 objective lens
206 hologram element
207 diffraction optical element
208 optical detector
L300 light reflected from optical disc
O100, O300 center of optical detector
A100, A400 axis on diffraction optical element coinciding with optical disc tangential direction
A300 axis on diffraction optical element coinciding with optical disc radial direction
A110, A210, A410 axis on optical detector coinciding with optical disc tangential direction
A310 axis on optical detector coinciding with optical disc radial direction
11a to 11g, 12a to 12g, 13a to 13g, 30a to 30i, 40a to 40g divided region in diffraction optical element
A10 to G10, C11 to C14, D11 to D14, E11 to E14, F11 to F14, C21, C22, D21, D22, E21, E22, F21, F22, A30 to I30, A31 to H31, A32 to D32, A40 to G40, P40 to S40, I41 to I49, J41 to J49, K41 to K46, L41 to L46, M41 to M46, N41 to N46, A50 to G50, P50 to S50, I51 to I53, J51 to J53, K51 to K56, L51 to L56, M51 to M56, N51 to N56 light receiving element of optical detector.

What is claimed is:

1. An optical pickup comprising:
a light source;
an optical system for irradiating a recording medium including a plurality of recording layers with light from the light source;
a diffraction optical element that divides light reflected from the recording medium into a plurality of optical fluxes and diffracts the fluxes; and
an optical detector receiving the optical flux diffracted by the diffraction optical element;

wherein the optical detector includes a light receiving element detecting a focus error signal, a longitudinal direction of the light receiving element being arranged coinciding with a circumferential direction of the recording medium, or arranged inclined to a circumferential or radial direction;

wherein the focus error signal is detected from a region other than a central region of the reflected light and other than a push-pull region of the diffraction optical element; and wherein the pickup is arranged such that $0 \leq \phi \leq 20$, where an angle $\theta$ is between an axis of a circumferential direction passing through a center of the reflected light and a line passing through the center of the reflected light and a center of a circular arc of the reflected light in a focus error detection region, and an inclination $\phi$ is of the longitudinal direction of the light receiving element with reference to the axis of the circumferential direction.

2. An optical pickup comprising:

a light source;

an optical system for irradiating a recording medium including a plurality of recording layers with light from the light source;

a diffraction optical element that divides light reflected from the recording medium into a plurality of optical fluxes and diffracts the fluxes; and an optical detector receiving the optical flux diffracted by the diffraction optical element;

wherein the optical detector includes a light receiving element detecting a focus error signal, a longitudinal direction of the light receiving element being arranged coinciding with a circumferential direction of the recording medium, or arranged inclined to a circumferential or radial direction;

wherein the focus error signal is detected from a region other than a central region of the reflected light and other than a push-pull region of the diffraction optical element, and wherein the pickup is arranged such that $0 \leq \phi \leq 20$, where an angle $\theta$ is between an axis of a circumferential direction passing through a center of the reflected light and a line passing through the center of the reflected light and a center of a circular arc of the reflected light in a focus error detection region, and an inclination $\phi$ is of the longitudinal direction of the light receiving element with reference to the axis of the circumferential direction.

3. An optical pickup comprising:

a light source;

an optical system for irradiating a recording medium including a plurality of recording layers with light from the light source;

a diffraction optical element that divides light reflected from the recording medium into a plurality of optical fluxes and diffracts the fluxes; and an optical detector receiving the optical flux diffracted by the diffraction optical element;

wherein the optical detector includes a light receiving element detecting a focus error signal, a longitudinal direction of the light receiving element being arranged coinciding with a circumferential direction of the recording medium, or arranged inclined to a circumferential or radial direction;

wherein the focus error signal is detected from a push-pull region of the diffraction optical element; and wherein the pickup is arranged such that $0 \leq \phi \leq 20$, where an angle $\theta$ is between an axis of a radial direction passing through a center of the reflected light and a line passing through the center of the reflected light and a center of a circular arc of the reflected light in a focus error detection region, and an inclination $\phi$ is of the longitudinal direction of the light receiving element with reference to the axis of the radial direction.

4. An optical pickup comprising:

a light source;

an optical system for irradiating a recording medium including a plurality of recording layers with light from the light source;

a diffraction optical element that divides light reflected from the recording medium into a plurality of optical fluxes and diffracts the fluxes; and an optical detector receiving the optical flux diffracted by the diffraction optical element;

wherein the optical detector includes a light receiving element detecting a focus error signal, a longitudinal direction of the light receiving element being arranged coinciding with a circumferential direction of the recording medium, or arranged inclined to a circumferential or radial direction; and wherein the pickup is arranged such that $0 \leq \phi \leq 20$, where an angle $\theta$ is between an axis in a circumferential direction passing through a center of the reflected light on the diffraction grating and a line passing through the center of the reflected light and a center of a circular arc of the reflected light in a divided region on the diffraction grating and an inclination $\phi$ is of the longitudinal direction of the light receiving element with reference to the axis of the circumferential direction.

5. An optical pickup comprising:

a light source;

an optical system for irradiating a recording medium including a plurality of recording layers with light from the light source;

a diffraction optical element that divides light reflected from the recording medium into a plurality of optical fluxes and diffracts the fluxes; and an optical detector receiving the optical flux diffracted by the diffraction optical element;

wherein the optical detector includes a light receiving element detecting a focus error signal, a longitudinal direction of the light receiving element being arranged coinciding with a circumferential direction of the recording medium, or arranged inclined to a circumferential or radial direction; and wherein the pickup is arranged such that $0 \leq \phi \leq 20$, where an angle $\theta$ is between an axis in a circumferential direction passing through a center of the reflected light on the diffraction grating and a line passing through the center of the reflected light and a center of a circular arc of the reflected light in a divided region on the diffraction grating and an inclination $\phi$ is of the longitudinal direction of the light receiving element with reference to the axis of the circumferential direction.

6. The optical pickup according to claim 1, wherein the focus error signal is detected by the knife edge method, and the diffraction optical element does not cause 0-order light.

7. The optical pickup according to claim 1, wherein the diffraction grating includes a first region other than a central region of the reflected light and other than a push-pull region, and diffracts light passing through the first region in the circumferential and radial directions, thereby generating first diffracted light.

8. The optical pickup according to claim 1,
wherein the diffraction optical element includes a push-pull region, and
diffracts light passing through the push-pull region in the circumferential direction, thereby generating second diffracted light.

9. An optical pickup comprising:
a light source;
an optical system for irradiating a recording medium including a plurality of recording layers with light from the light source;
a diffraction optical element that divides light reflected from the recording medium into a plurality of optical fluxes and diffracts the fluxes; and
an optical detector receiving the optical flux diffracted by the diffraction optical element;
wherein the optical detector includes a light receiving element detecting a focus error signal, a longitudinal direction of the light receiving element being, arranged coinciding with a circumferential direction of the recording medium, or arranged inclined to a circumferential or radial direction;
wherein a tracking error signal detected from the recording medium is generated according to a following expression, $$TES_{DPP}1 = (A10-B10) - kt \times \{(C10+D10) - (E10+F10)\},$$

wherein regions A10 and B10 receive light of a push-pull region, and regions C10, D10, E10 and F10 receive light of a region other than a central region and other than the push-pull region;
wherein the constant kt is a ratio of an amount of light of the region other than the central region and other than the push-pull region to an entire amount of light; and
wherein a value of the constant kt increases a dispersion ratio of one to the other of ±n-order light in the region other than the central region and other than the push-pull region, according to an area ratio of the region other than the central region and other than the push-pull region.

10. An optical information recording and reproducing apparatus, comprising:
a light source;
an optical system for irradiating a recording medium including a plurality of recording layers with light from the light source;
a diffraction optical element that divides light reflected from the recording medium into a plurality of optical fluxes and diffracts the fluxes;
an optical detector receiving the optical flux diffracted by the diffraction optical element;
a circuit generating a reproduction signal, a focus error signal and a tracking signal from a signal detected by the optical detector; and
a controller controlling focusing and tracking according to the focus error signal and the tracking signal,
wherein the optical detector includes a light receiving element detecting a focus error signal, a longitudinal direction of the light receiving element being arranged coinciding with a circumferential direction of the recording medium, or arranged inclined to a circumferential or radial direction;
wherein the focus error signal is detected from a region other than a central region of the reflected light and other than a push-pull region of the diffraction optical element; and
wherein the pickup is arranged such that $0 \leq \phi 20$, where an angle θ is between an axis of a circumferential direction passing through a center of the reflected light and a line passing through the center of the reflected light and a center of a circular arc of the reflected light in a focus error detection region, and an inclination φ is of the longitudinal direction of the light receiving element with reference to the axis of the circumferential direction.

* * * * *